US006633529B1

(12) United States Patent
Yamada et al.

(10) Patent No.: US 6,633,529 B1
(45) Date of Patent: Oct. 14, 2003

(54) DISK DRIVE AND SEALING MEMBER

(75) Inventors: Takashi Yamada, Tokyo (JP);
Kazuyuki Yamamoto, Kanagawa (JP);
Yotaro Sanada, Tokyo (JP); Kazuo Takahashi, Tokyo (JP); Toshio Mamiya, Tokyo (JP)

(73) Assignee: Sony Corporation, Tokyo (JP)

( * ) Notice: Subject to any disclaimer, the term of this patent is extended or adjusted under 35 U.S.C. 154(b) by 261 days.

(21) Appl. No.: 09/606,856

(22) Filed: Jun. 29, 2000

(30) Foreign Application Priority Data

Jun. 30, 1999 (JP) .......................................... P11-186835
Jan. 28, 2000 (JP) ..................................... P2000-024832

(51) Int. Cl.[7] ............................................. G11B 25/04
(52) U.S. Cl. ..................................... 369/77.2; 369/271
(58) Field of Search .............................. 369/75.1, 75.2, 369/77.1, 77.2, 258, 263, 264, 270, 271; 360/97.02, 97.03, 97.04, 98.08, 99.05, 99.12

(56) References Cited

FOREIGN PATENT DOCUMENTS

| JP | 5-128805 | * | 5/1993 |
| JP | 6-84326 | * | 3/1994 |
| JP | 10-64243 | * | 3/1998 |
| JP | 10-188510 | * | 7/1998 |

* cited by examiner

Primary Examiner—David L. Ometz
(74) Attorney, Agent, or Firm—Jay H. Maioli

(57) ABSTRACT

A disk drive preventing entry of air containing dust into a cartridge when a rotation table enters from an opening formed in a bottom surface of the cartridge and makes a disk-shaped recording medium rotate includes a carrier in which a cartridge accommodating a hard disk is loaded, a rotation table which enters from a disk drive opening in the bottom surface of the cartridge, clamps and makes the disk rotate when the cartridge is loaded in the carrier, and a sealing member which is attached to the carrier and which is formed with a lip in press-contact with the bottom surface of the cartridge so as to surround the disk drive opening when the cartridge is loaded in the carrier. The sealing member includes through holes through which height positioning projections penetrate to attach the sealing member to the carrier.

16 Claims, 27 Drawing Sheets

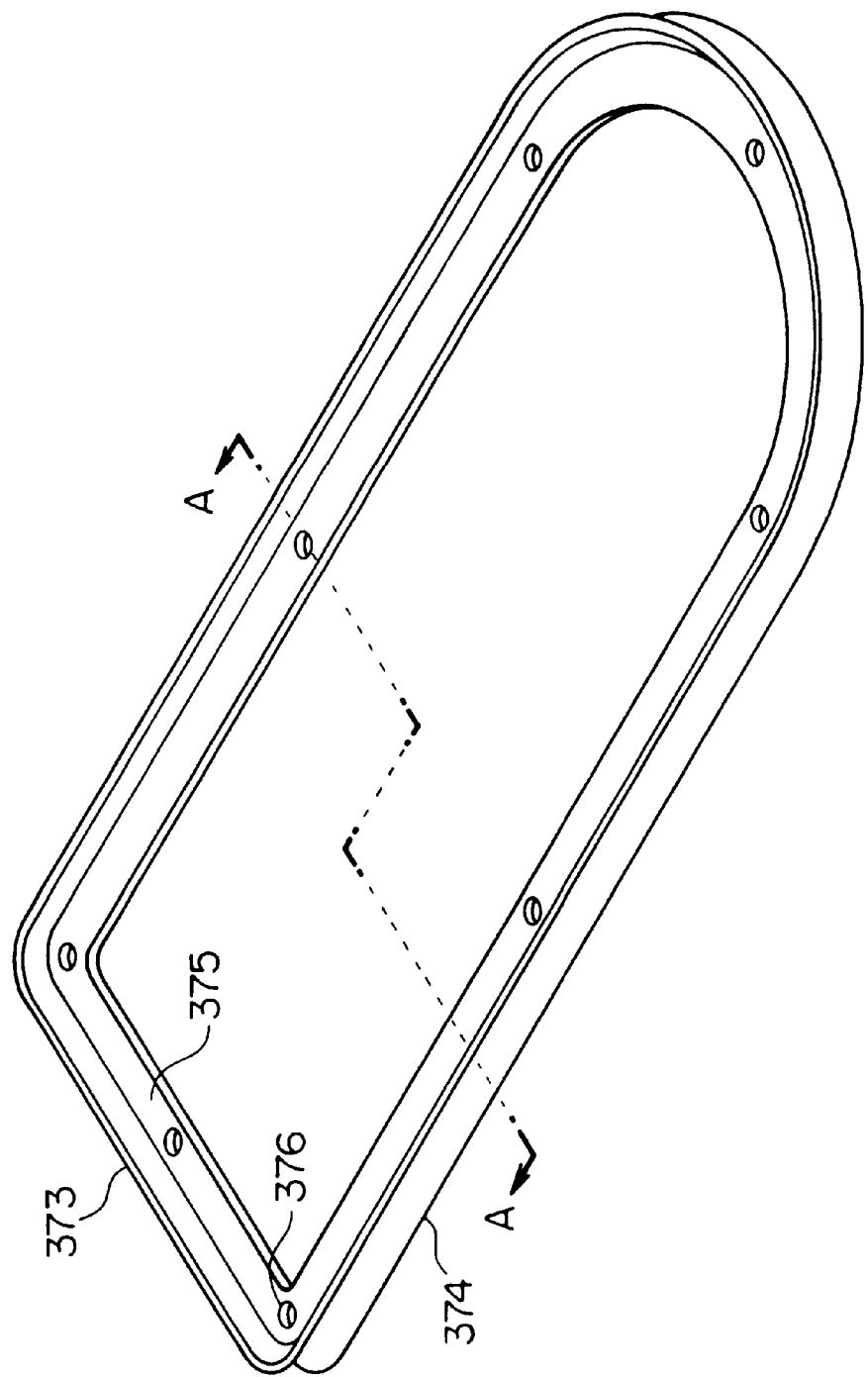

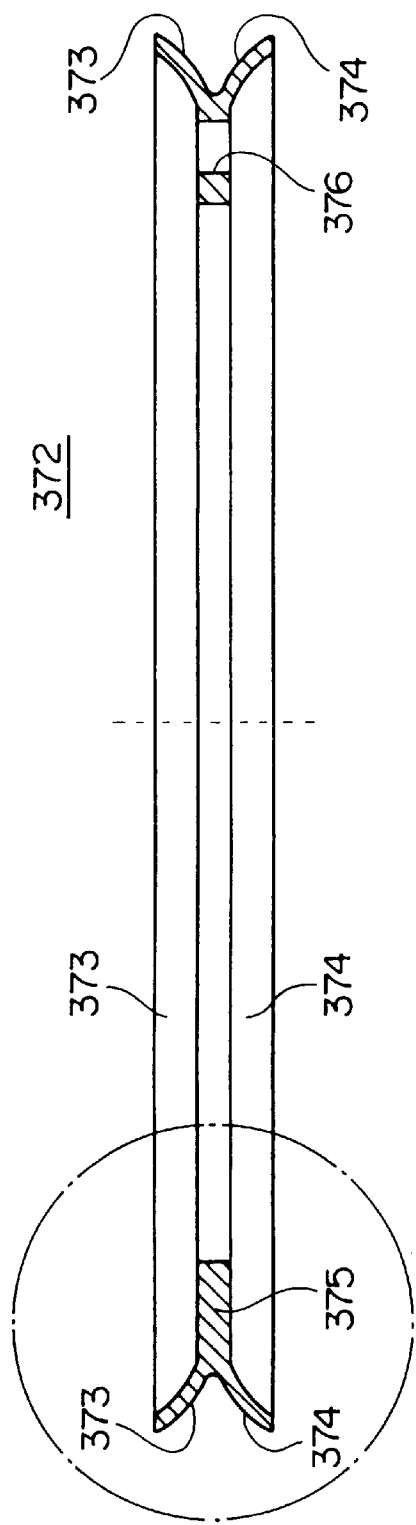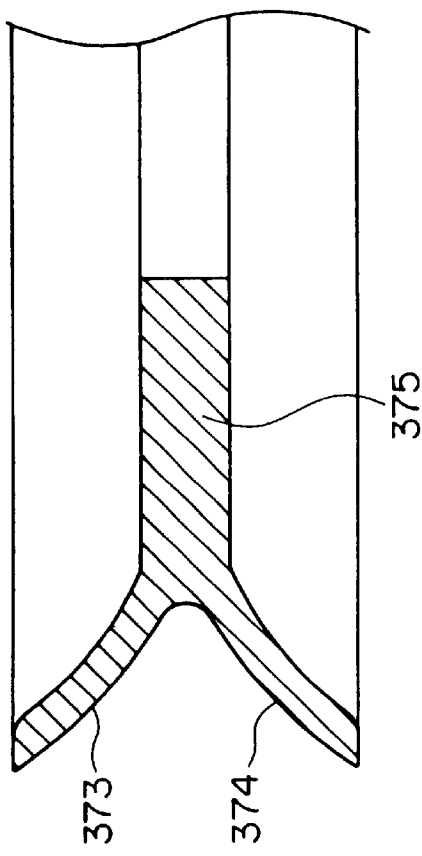
FIG. 27A
FIG. 27B

DISK DRIVE AND SEALING MEMBER

BACKGROUND OF THE INVENTION

1. Field of the Invention

The present invention relates to a disk drive in which entry of dust etc. into a cartridge accommodating a disk-shaped recording medium is prevented by a sealing member and to a sealing member used for the same.

2. Description of the Related Art

Known is a disk drive in which a disk cartridge accommodating a hard disk is loaded.

This disk drive is provided with a carrier into which the disk cartridge is loaded, a rotation mechanism having a rotation table for clamping and making the hard disk rotate, and a magnetic head mechanism for recording and/or playing back a signal (or information) to or from the hard disk.

In a disk drive, when a disk cartridge is loaded in the carrier, the rotation mechanism enters the cartridge body from a disk drive opening formed in its bottom surface and a magnetic head element enters it from a recording and playback opening positioned close to the outside of the hard disk.

When the hard disk rotates due to the rotation mechanism, the magnetic head element entering into the cartridge body from the recording and playback opening slightly floats due to an air flow generated between the rotating hard disk and the magnetic head element and is operated so as to move across the inner and outer circumferences of the hard disk to record and/or play back a signal with respect to the hard disk.

Summarizing the problem to be solved by the invention, hard disks include ones having a diameter of about 65 mm and increased in capacity so as to enable recording of several gigabytes of information or signals.

In such hard disks, when recording or playing back dust and other foreign matter, the magnetic head element is operated so as to move across the inner and outer circumferences of the hard disk in a state where the magnetic head element floats several tens of nanometers from the hard disk.

At this time, if the hard disk is rotated at a high speed by the rotation mechanism, air is sucked into the cartridge body from the disk drive opening in which the rotation mechanism enters. For this reason, dust etc. is liable to invade the cartridge body due to the air flow.

In a disk drive for recording or playing back information or a signal in the state with magnetic head element floating from the hard disk by tens of nanometers, if dust etc. invading the cartridge body from the disk drive opening deposits on the hard disk, the magnetic head element collides with the dust, so it becomes difficult to reliably record and play back the information or signal to and from the hard disk.

Further, if dust etc. deposits on the hard disk, the amount by which the magnetic head element floats from the hard disk fluctuates, so it becomes difficult to reliably record the information or signal on the hard disk.

Note that Japanese Unexamined Patent Publication No. 10-188510 discloses an invention of such a disk drive.

This publication discloses to seal the outer circumference of a hub of the loaded disk cartridge, for example, to seal the space between the periphery of the hub of the cartridge and a motor housing of the spindle motor by a resilient sealing member having a tapered surface contacting the bottom surface of the cartridge.

In this publication, however, the sealing member was fixed to the motor housing etc. beneath the inclined resilient tapered surface, so attachment of the sealing member was troublesome.

SUMMARY OF THE INVENTION

A first object of the present invention is to provide a disk drive capable of preventing air containing the dust from invading a cartridge from an opening in a bottom surface of a cartridge at the time of rotation of a disk-shaped recording medium loaded in the disk drive and a sealing member useable in this disk drive.

A second object of the present invention is to provide a disk drive capable of reducing the trouble of attaching the sealing member.

To attain the above objects, according to a first aspect of the present invention, there is provided a disk drive having a carrier in which is loaded a cartridge in which a disk-shaped recording medium is rotatably accommodated and in which an opening for exposing a center portion of the disk-shaped recording medium is formed in its bottom surface, a rotation table which enters from the opening of the cartridge loaded in the carrier, clamps the disk-shaped recording medium at the center portion and makes the disk-shaped recording medium rotate, and a resilient sealing member which is attached to the carrier and prevents air containing dust from being sucked into the cartridge from the opening due to rotation of the disk-shaped recording medium, wherein the sealing member has an annular base portion and a lip having a shape projecting from the annular base portion and flaring outward, the lip is pushed against the bottom surface of the cartridge so as to surround the opening of the loaded cartridge, and the base portion has a part located inward from the lip, which part is attached to the carrier.

In the disk drive according to the present invention, preferably provision is further made of a plurality of projections for positioning the cartridge, each of the plurality of projections has a head contacting the bottom surface of the cartridge, the base portion has a plurality of through holes corresponding to the plurality of projections in the part located inward from the lip, and the sealing member is attached to the carrier by the plurality of projections penetrating through the corresponding plurality of through holes.

In the disk drive according to the present invention, more preferably the head of each projection has a diameter larger than that of the through hole to an extent enabling the projection to be fit into the through hole.

In the disk drive according to the present invention, preferably the lip comprises first and second lips, the first and second lips project from a top surface of the base portion, the first lip is located outside from the second lip, a height of the first lip from the center portion of the base portion is higher than the height of the second lip from the center portion of the base portion when the cartridge is not loaded, and the first and second lips contact the bottom surface of the cartridge and the heights of the first and second lips from the center portion of the base portion are the same when the cartridge is loaded.

In the disk drive according to the present invention, more preferably the first and second lips are substantially parallel, a length of the first lip is longer than the length of the second lip, and the heights of the first and second lips from the center portion of the base portion are substantially the same when the cartridge is not loaded.

In the disk drive according to the present invention, alternatively the lip has first and third lips, the first lip projects from the top surface of the base portion and contacts the bottom surface of the cartridge when the cartridge is loaded, and the third lip projects from a bottom surface of the base portion and contacts the carrier.

In the disk drive according to the present invention, more preferably the first and third lips are formed symmetrically or substantially symmetrically to each other about the base portion.

In the disk drive according to the present invention, alternatively the lip has first, second, third, and fourth lips, the first and second lips project from the top surface of the base portion and contact the bottom surface of the cartridge when the cartridge is loaded, the third and fourth lips project from the bottom surface of the base portion and contact the carrier, the first lip is located outside from the second lip, the third lip is located outside from the fourth lip, the height of the first lip from the center portion of the base portion is higher than the height of the second lip from the center portion of the base portion and the height of the third lip from the center portion of the base portion is higher than the height of the fourth lip from the center portion of the base portion when the cartridge is not loaded, and the first and second lips contact the bottom surface of the cartridge, the heights of the first and second lips from the center portion of the base portion are the same, and the heights of the third and fourth lips from the center portion of the base portion are the same when the cartridge is loaded.

In the disk drive according to the present invention, more preferably the first and second lips are substantially parallel to each other, the third and fourth lips are substantially parallel to each other, the length of the first lip is longer than the length of the second lip, the length of the third lip is longer than the length of the fourth lip, and the heights of the first and second lips from the center portion of the base portion are substantially the same and the heights of the third and fourth lips from the center portion of the base portion are substantially the same when the cartridge is not loaded.

In the disk drive according to the present invention, more preferably the first and third lips are formed symmetrically or substantially symmetrically to each other about the base portion, and the second and fourth lips are formed symmetrically or substantially symmetrically to each other about the base portion.

In the disk drive according to the present invention, preferably the base portion has a projection for positioning of the cartridge, the related positioning projection is formed along the inner circumference of the base portion, and the height of the projection from the center portion of the base portion is lower than the height of the lip from the center portion of the base portion when the cartridge is not loaded and the same as the height of the lip from the center portion of the base portion when the cartridge is loaded.

In the disk drive according to the present invention, preferably the base portion of the sealing member is fixed to the carrier via a filter for filtering the air and the air filtered by the filter is sucked from the opening at the time of rotation of the disk-shaped recording medium.

In the disk drive according to the present invention, preferably the lip has a vent hole through which the air passes, a filter for filtering the air is attached so as to cover the vent hole, and the air passing through the vent hole and the filter is sucked from the opening at the time of rotation of the disk-shaped recording medium.

In the disk drive according to the present invention, more preferably the filter is attached to the outer circumference of the lip and the air filtered by the filter passes through the vent hole and is sucked from the opening.

In the disk drive according to the present invention, more preferably the cartridge has a shutter, the shutter is closed when the cartridge is not loaded and is opened to expose the opening when the cartridge is loaded, and the lip of the sealing member is pushed against the periphery of the opening in a flat part appearing due to movement of the shutter when the cartridge is loaded.

In the disk drive according to the present invention, more preferably provision is further made of an optical pickup, the disk-shaped recording medium is an optical disk, and the opening exposes the center portion and exposes a part of the disk-shaped recording medium to which a laser beam from the pickup is focused when the cartridge is loaded.

In the disk drive according to the present invention, alternatively more preferably provision is further made of an optical pickup and a magnetic head element, the disk-shaped recording medium is a magneto-optic disk, the opening has a first opening formed in the bottom surface of the cartridge and a second opening formed in the top surface of the cartridge, the first opening exposes the center portion and exposes a part of the disk-shaped recording medium to which a laser beam from the optical pickup is focused when the cartridge is loaded, the second opening exposes a part facing the magnetic head element when the cartridge is loaded, the sealing member comprises first and second sealing members, the first sealing member seals the space between the periphery of the first opening and the carrier, and the second sealing member seals the space between the periphery of the second opening and the carrier.

In the disk drive according to the present invention, alternatively more preferably provision is further made of an optical pickup and a magnetic head element, the disk-shaped recording medium is a magneto-optic disk, the opening has a first opening formed in the bottom surface of the cartridge and a third opening formed in a side surface of the cartridge, the first opening exposes the center portion and exposes a part of the disk-shaped recording medium to which the laser beam from the optical pickup is focused when the cartridge is loaded, the third opening has inserted into it the magnetic head element when the cartridge is loaded, and the sealing member seals the space between the periphery of the first opening and the carrier.

In the disk drive according to the present invention, more preferably the sealing member is made of a silicone rubber, and the disk-shaped recording medium is a removable hard disk.

A sealing member according to the present invention is a resilient sealing member having an annular base portion and a lip having a shape projecting from the base portion and flaring outward, the base portion has a part located inward from the lip, and a plurality of through holes are formed in the related part.

In the sealing member according to the present invention, preferably the lip comprises first and second lips, the first and second lips projected from one surface between the top and bottom surfaces of the base portion, the first lip is located outside from the second lip, and the height of the first lip from the center portion of the base portion is higher than the height of the second lip from the center portion of the base portion.

In the sealing member according to the present invention, more preferably the first and second lips are substantially parallel to each other, the length of the first lip is longer than the length of the second lip, and the heights of the first and second lips from the center portion of the base portion are substantially the same.

In the sealing member according to the present invention, more preferably the lip has first and third lips, the first lip projects from the top surface of the base portion, and the third lip projects from the bottom surface of the base portion.

In the sealing member according to the present invention, more preferably the first and third lips are symmetrical or substantially symmetrical to each other about the base portion.

In the sealing member according to the present invention, preferably the lip has first, second, third, and fourth lips, the first and second lips project from the top surface of the base portion, the third and fourth lips project from the bottom surface of the base portion, the first lip is located outside from the second lip, the third lip is located outside from the fourth lip, the height of the first lip from the center portion of the base portion is higher than the height of the second lip from the center portion of the base portion, and the height of the third lip from the center portion of the base portion is higher than the height of the fourth lip from the center portion of the base portion.

In the sealing member according to the present invention, more preferably, the first and second lips are substantially parallel to each other, the third and fourth lips are substantially parallel to each other, the length of the first lip is longer than the length of the second lip, the length of the third lip is longer than the length of the fourth lip, the heights of the first and second lips from the center portion of the base portion are substantially the same, and the heights of the third and fourth lips from the center portion of the base portion are substantially the same.

In the sealing member according to the present invention, more preferably the first and third lips are formed symmetrically or substantially symmetrically to each other about the base portion, and the second and fourth lips are formed symmetrically or substantially symmetrically to each other about the base portion.

In the sealing member according to the present invention, more preferably the lip has a hole, and a filter for filtering the air is attached so as to cover the related hole.

In the sealing member according to the present invention, more preferably the filter is attached to the outer circumference of the lip.

In the sealing member according to the present invention, it is also possible to employ a structure in which for example the base portion forms a band shape having the same width or substantially the same width along the periphery of a predetermined shape, and the predetermined shape is the same or substantially the same as a square, oval, or a circle.

In the sealing member according to the present invention, it is also possible to employ a structure in which for example the base portion forms a band shape having the same width or substantially the same width along the periphery of a predetermined shape, and the predetermined shape is the same or substantially the same as a shape of a rectangle with one short side removed and an arc of a semi-circle having a diameter equal to the length of the related short side connected to the ends of the two long sides.

The resilient sealing member is attached to the carrier in which the cartridge is loaded. This sealing member prevents air containing dust from being sucked into the cartridge from the opening by the rotating disk-shaped recording medium, therefore it is possible to improve the reliability of the recording and playback of a signal and the reliability of the disk drive.

The sealing member has an annular base portion and a lip having a shape projecting from the base portion and flaring outward. This lip is pushed against the bottom surface of the cartridge so as to surround the opening of the loaded cartridge, a front end of the lip flares outwardly, and the bottom surface of the cartridge and the inclined surface of the lip contact for the sealing.

The base portion has a part located inward from the lip. By attaching the related part to the carrier, the trouble of attachment of the sealing member can be reduced compared with the case where the member is attached beneath the inclined resilient lip.

BRIEF DESCRIPTION OF THE DRAWINGS

The above objects and features of the present invention will be more apparent from the following description of the preferred embodiments given with reference to the accompanying drawings, wherein:

FIG. 26 is a perspective view of the second sealing member of FIG. 25;

FIGS. 27A and 27B are sectional views taken along the arrow of the second sealing member of FIG. 25;

FIGS. 30A and 30B are explanatory views of another example of a disk cartridge accommodating a magneto-optic disk, in which FIG. 30A is a side view on the shutter side in the state where the shutter of the disk cartridge is open, and FIG. 30B is a top view of the disk cartridge in the state where the shutter of the disk cartridge is open.

DESCRIPTION OF THE PREFERRED EMBODIMENTS

Below, preferred embodiments of the present invention will be explained by referring to the attached drawings.

Figure 1:
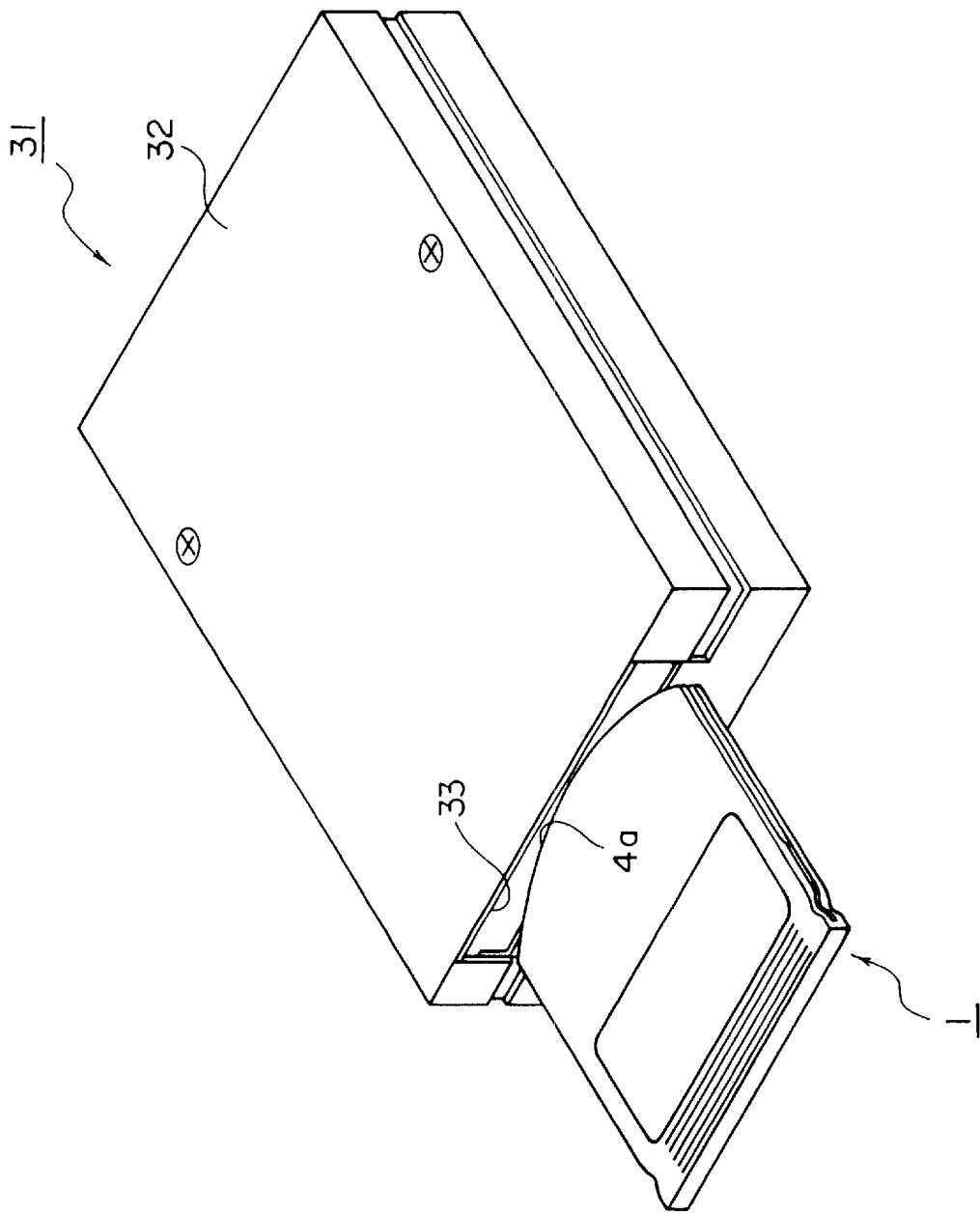
FIG. 1 is a perspective view of the state of usage of a disk drive.

FIG. 1 is a perspective view of the state of usage of the disk drive.

As shown in FIG. 1, a disk drive 31 to which the present invention is applied uses a disk cartridge 1. In the disk cartridge 1, a disk-shaped recording medium such as a hard disk is accommodated so that it can freely rotate. Note that, here, the explanation will be made of the case where the disk-shaped recording medium is a hard disk.

In this disk drive 31, the disk cartridge 1 is inserted and ejected via an opening 33 provided at the front surface of a drive body 32.

Figure 2:
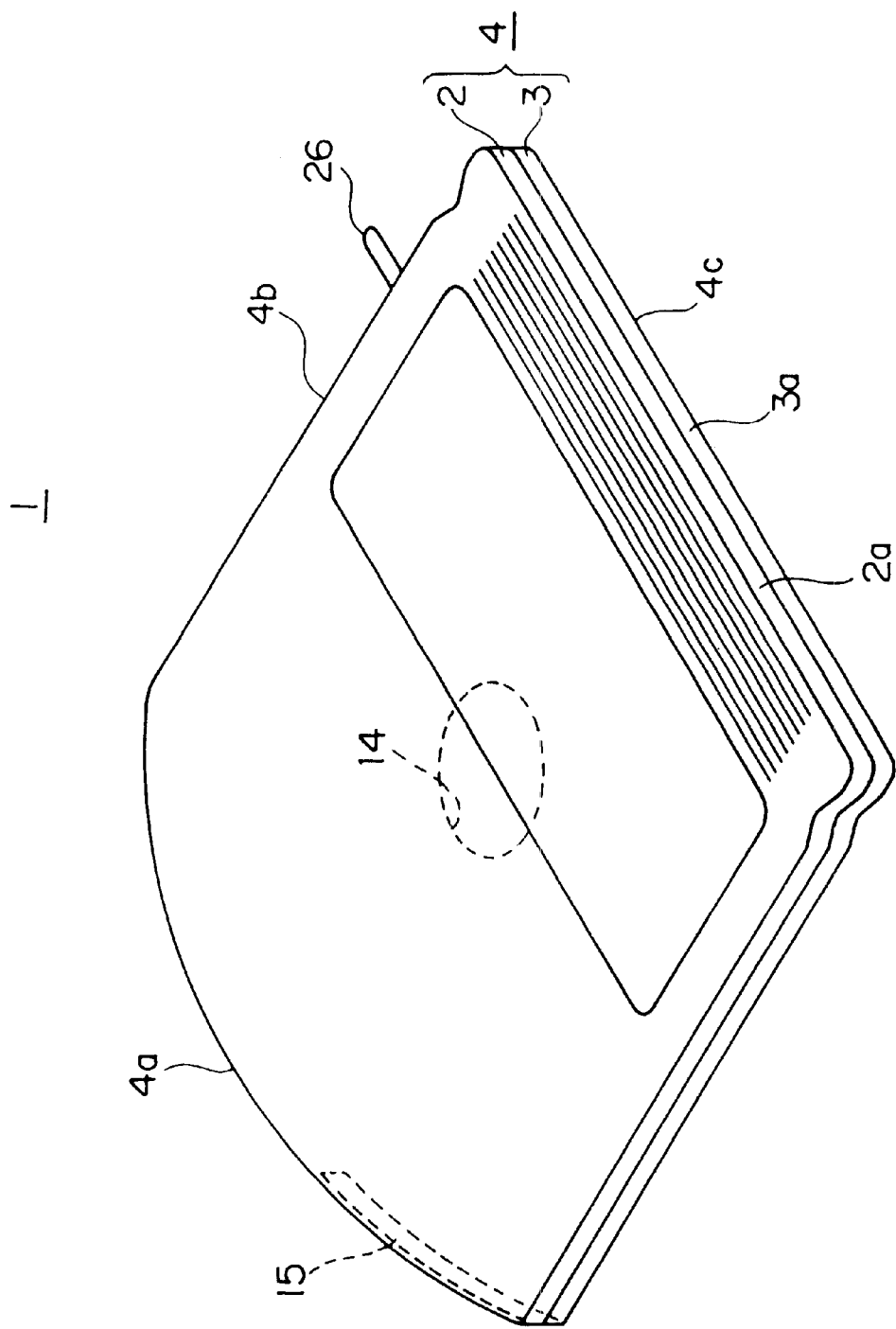
FIG. 2 is a perspective view of a disk cartridge.

FIG. 2 is a perspective view of a disk cartridge.

As shown in FIG. 2, the disk cartridge 1 is provided with a cartridge body 4 comprised of a pair of upper and lower halves (shells) 2 and 3 mated with each other and connected at their circumferential edges by a plurality of screws, bonding, etc. A hard disk is accommodated in this cartridge body 4.

Figure 3:
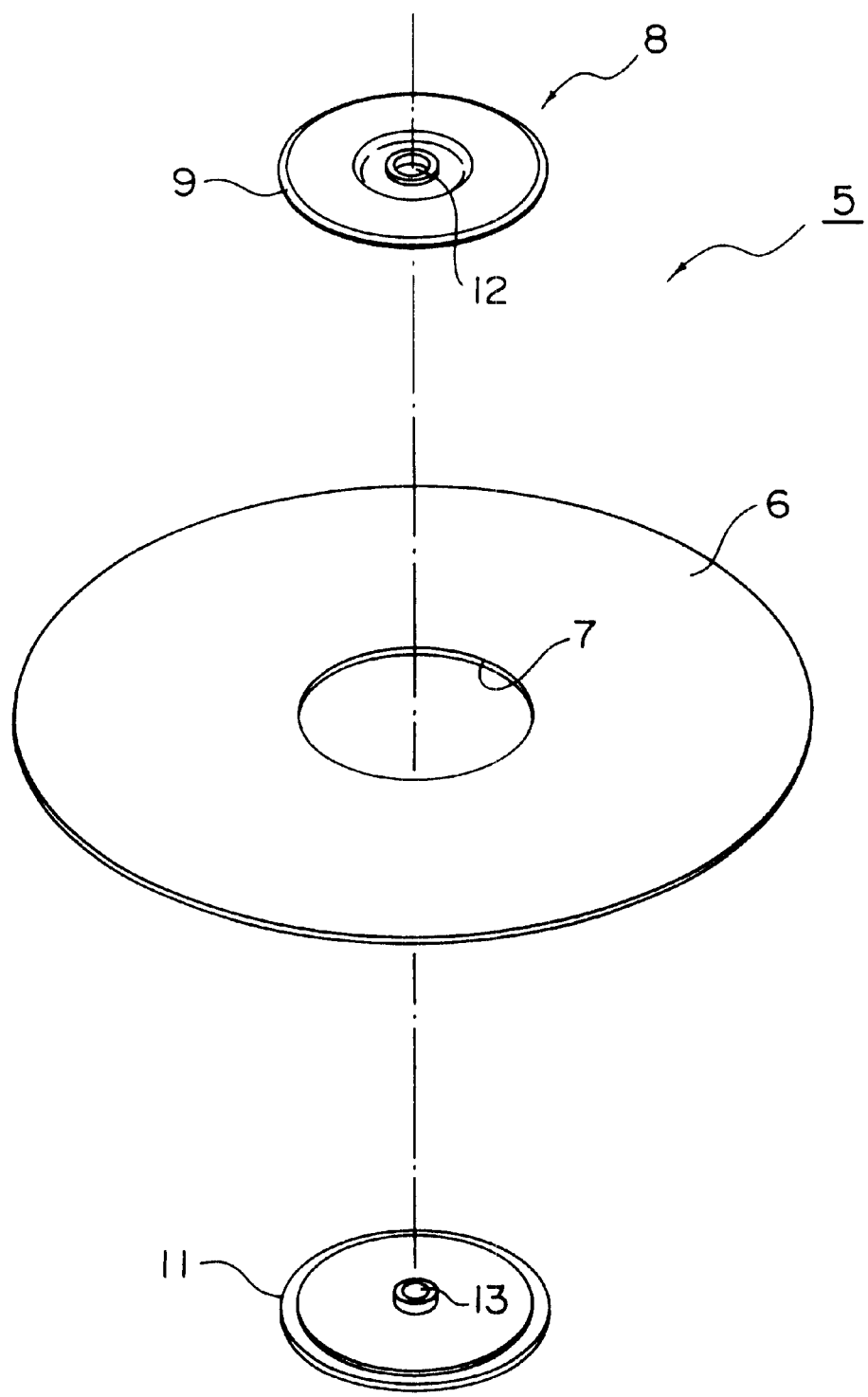
FIG. 3 is an exploded perspective view of a hard disk used as the recording medium of the disk cartridge.

FIG. 3 is an exploded perspective view of a hard disk used as a recording medium of a disk cartridge.

As shown in FIG. 3, a hard disk 5 accommodated in the cartridge body has a disk body 6 comprised of a hard disk substrate coated with a magnetic layer and a protection layer.

A center hole 7 is provided at the center of the disk body 6. This center hole 7 has attached to it a hub mechanism 8 constituting a portion for clamping a rotation mechanism of the disk drive 31.

This hub mechanism 8 comprises an upper hub 9 and a lower hub 11 formed substantially circularly to a size enough to close the center hole 7.

The upper and lower hubs 9 and 11 are formed by a magnetic material such as a metal and magnetically attracted by a magnet constituting the rotation mechanism. Further, the center portions of the upper and lower hubs 9 and 11 are provided with insertion holes 12 and 13 through which a spindle shaft of the rotation mechanism side is inserted.

The upper and lower hubs 9 and 11 are attached so as to grip the circumferential edge of the center hole 7 of the disk body 6 so that the insertion holes 12 and 13 are communicated (are connected in state). Then, the spindle shaft of the rotation mechanism is inserted through the insertion holes 12 and 13, and the hub mechanism 8 is magnetically attracted by the magnet, whereby the hard disk 5 integrally rotates with a rotation table (disk table) constituting the rotation mechanism in a centered state.

As shown in FIG. 2, the cartridge body 4 in which the hard disk is rotatably accommodated is comprised by mating and joining upper and lower halves 2 and 3 formed by injection molding a synthetic resin.

In this cartridge body 4, a front wall 4a acting as an end for insertion into the disk drive 31 is formed to substantially an arc shape so as to have substantially the same arc as the outer shape of the hard disk 5.

Further, partition walls of substantially arc shapes are provided at the inner surfaces of the upper and lower halves 2 and 3 so as to be inscribed by the rising circumferential walls (circumferential walls) 2a and 3a constituting the outer circumferential walls of the cartridge body 4. These partition walls form a disk accommodating portion in which the hard disk 5 is rotatably accommodated when the upper and lower halves 2 and 3 are mated and connected.

At substantially the center portion of the lower half 3 constituting the bottom surface of the cartridge body 4, a disk drive opening (motor access window) 14 through which the rotation mechanism of the disk drive 31 side enters is formed. This opening 14 exposes the center portion of the hard disk 5.

Note that the disk drive opening 14 is provided in only the lower half (lower shell) 3. The center portion on the top surface of the cartridge body 4 constituted by the upper half (upper shell) 2 is closed.

In the front wall 4a of the cartridge body 4 formed at the side in substantially an arc state, a recording and playback opening 15 through which a magnetic head device for recording or playing back information or a signal with respect to the hard disk 5 enters is formed to substantially a rectangular shape.

This recording and playback opening (magnetic head access window) 15 is formed to a size whereby a magnetic head element attached to the front end of the magnetic head device entering into the cartridge body 4 can be operated across the inner and outer circumferences of the hard disk 5.

Figure 4:
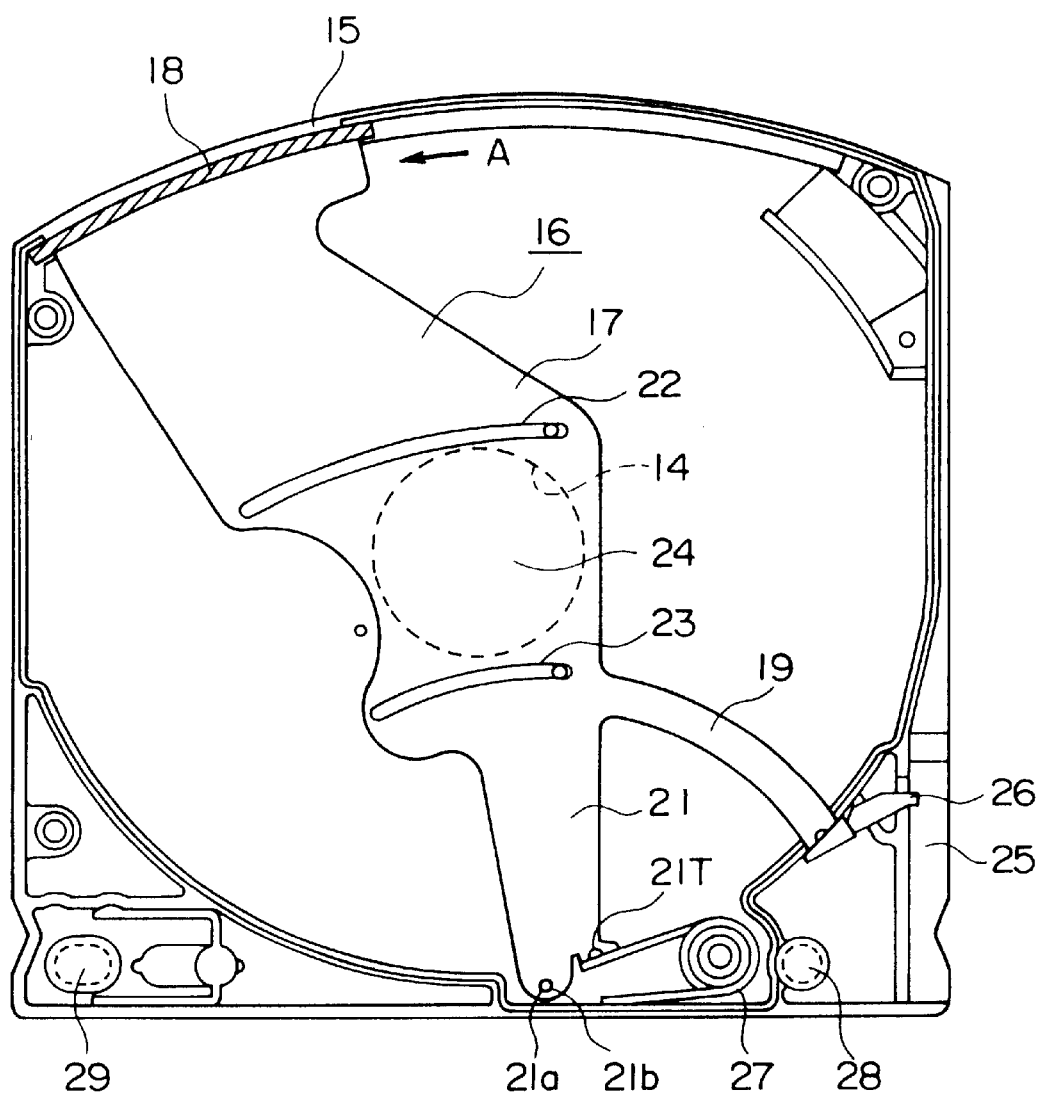
FIG. 4 is a plan view of the state of attachment of a shutter member to a cartridge body.

FIG. 4 is a plan view of the state of attachment of the shutter member to the cartridge body.

The cartridge body 4 formed with the disk drive opening 14 and the recording and playback opening 15 is provided with a shutter member 16 for opening and closing the disk drive opening 14 and the recording and playback opening 15.

This shutter member 16 has a base portion 17 constituting a first shutter portion for closing the disk drive opening 14, a second shutter portion 18 for closing the recording and playback opening 15, a shutter opening arm 19 for making the shutter member 16 pivot, and a support arm 21 for supporting the shutter member 16 which pivots (circularly moves in forward and reverse directions).

The base portion 17 is formed as substantially a flat plate so that it slides along the inner surface of the cartridge body 4 (so that it moves while rubbing in a contact state).

This base portion 17 is formed with guide holes 22 and 23 so as to be substantially parallel to a pivoting direction of the shutter member 16. The guide holes 22 and 23 engage with guide projections projecting from at the inner surface of the lower half 3 (provided in a projected state).

The base portion 17 is formed, at substantially the center portion sandwiched between the guide holes 22 and 23, with a first shutter portion 24 for closing the disk drive opening 14.

The front end of the base portion 17 is formed with the second shutter portion 18 for closing the recording and playback opening 15.

The second shutter portion 18 is formed in substantially an arc state with substantially the same curvature as that of the front wall 4a of the cartridge body 4 and is formed to a size enough to close the recording and playback opening 15.

The shutter opening arm 19 is formed on a side wall 4b side of the cartridge body 4 (refer to FIG. 2) integrally with the base portion 17. The side wall 4b becomes parallel to the insertion and ejection direction of the disk cartridge 1.

The front end of the shutter opening arm 19 is made to face outward from the guide hole 25 provided at the back side of the side wall 4b of the cartridge body 4. The front end positioned close to the outside of the cartridge body 4 from this guide hole 25 is formed with an engagement piece 26 with which the shutter opening mechanism of the disk drive 31 side is engaged.

Further, the base end side of the base portion 18 is provided with a support arm 21 for supporting the pivoting shutter member 16.

The support arm 21 is formed with a shaft hole 21a at the front end. Into this shaft hole 21a, a support shaft 21b provided at the inner surface of the lower half 3 is inserted close to a back wall 4c of the cartridge body 4.

The shutter member 16 is arranged in the cartridge body 4 so as to pivot about the support shaft 21b in a direction indicated by an arrow A in FIG. 4 for opening and closing the disk drive opening 14 and the recording and playback opening 15.

The shutter member 16 is biased to the direction indicated by the arrow A in FIG. 4 by a coil spring 27. This coil spring 27 is arranged in the vicinity of the back surface wall 4c of the cartridge body 4.

One end of the coil spring 27 is engaged with the cartridge body 4, and the other end is engaged with a claw 21T of the support arm so as to bias the shutter member 16 to the direction indicated by the arrow A in FIG. 4.

The shutter member 16 opens the openings 14 and 15 when the cartridge is loaded into the disk drive 31 (at the time of use) and closes the openings 14 and 15 and prevents the entry of dust and other foreign matter into the cartridge body 4 when the cartridge is not loaded (at the time of nonuse).

Further, in the vicinity of both corner portions on the back surface wall 4c side of the lower half 3 are formed positioning recesses 28 and 29 with which positioning pins for positioning the loading position when the disk cartridge 1 is loaded in the disk drive 31 are engaged.

One positioning recess 28 forms a circular cross section and acts as the reference portion, while the other positioning recess 29 is formed by a long hole so as to enable correction of the engagement position with respect to the positioning pin.

The disk cartridge 1 constituted as described above is in a state where the shutter member 16 closes the disk drive opening 14 and the recording and playback opening 15 when it is not used. The user can easily discriminate the direction for insertion into the disk drive 31 since the end for insertion into the disk drive 31 is formed to substantially an arc state.

When the disk cartridge 1 is inserted into the opening 33 of the disk drive 31 using as the insertion end the front wall 4a of the cartridge body 4, the shutter opening mechanism on the disk drive 31 side is engaged with the engagement piece 26 positioned close to the outside of the side wall 4b of the cartridge body 4, whereby the engagement piece 26 is moved to the back wall 4c side of the cartridge body 4 and the shutter member 16 is pivoted in a direction indicated by a reverse arrow A in FIG. 4 and opens the disk drive opening 14 and the recording and playback opening 15.

Then, the rotation mechanism on the disk drive 31 side enters from the disk drive opening 14 and the hub mechanism 8 is magnetically attracted by the magnet on the rotation mechanism side, whereby the rotation mechanism clamps the hard disk 5.

Also, the magnetic head device constituting the recording and playback means enters from the recording and playback opening 15. The hard disk 5 in the cartridge body 4 rotates synchronous to the disk table by the fact that the spindle motor of the rotation mechanism is driven and the magnetic head element at the front end of the magnetic head device is operated to move in the diameter direction of the hard disk 5, whereby the information or signal is recorded or played back.

Figure 5:
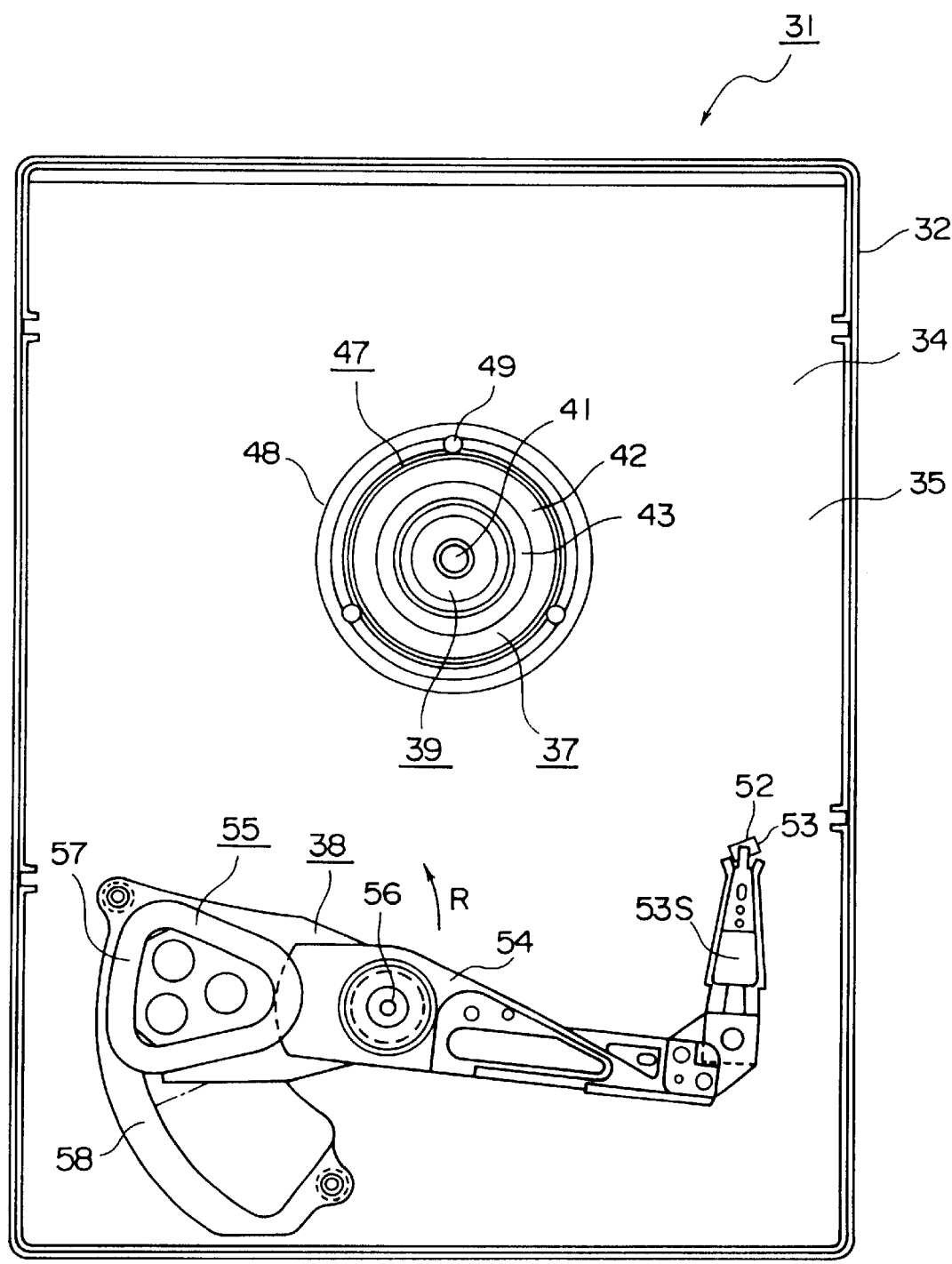
FIG. 5 is a plan view of a disk drive.
Figure 6:
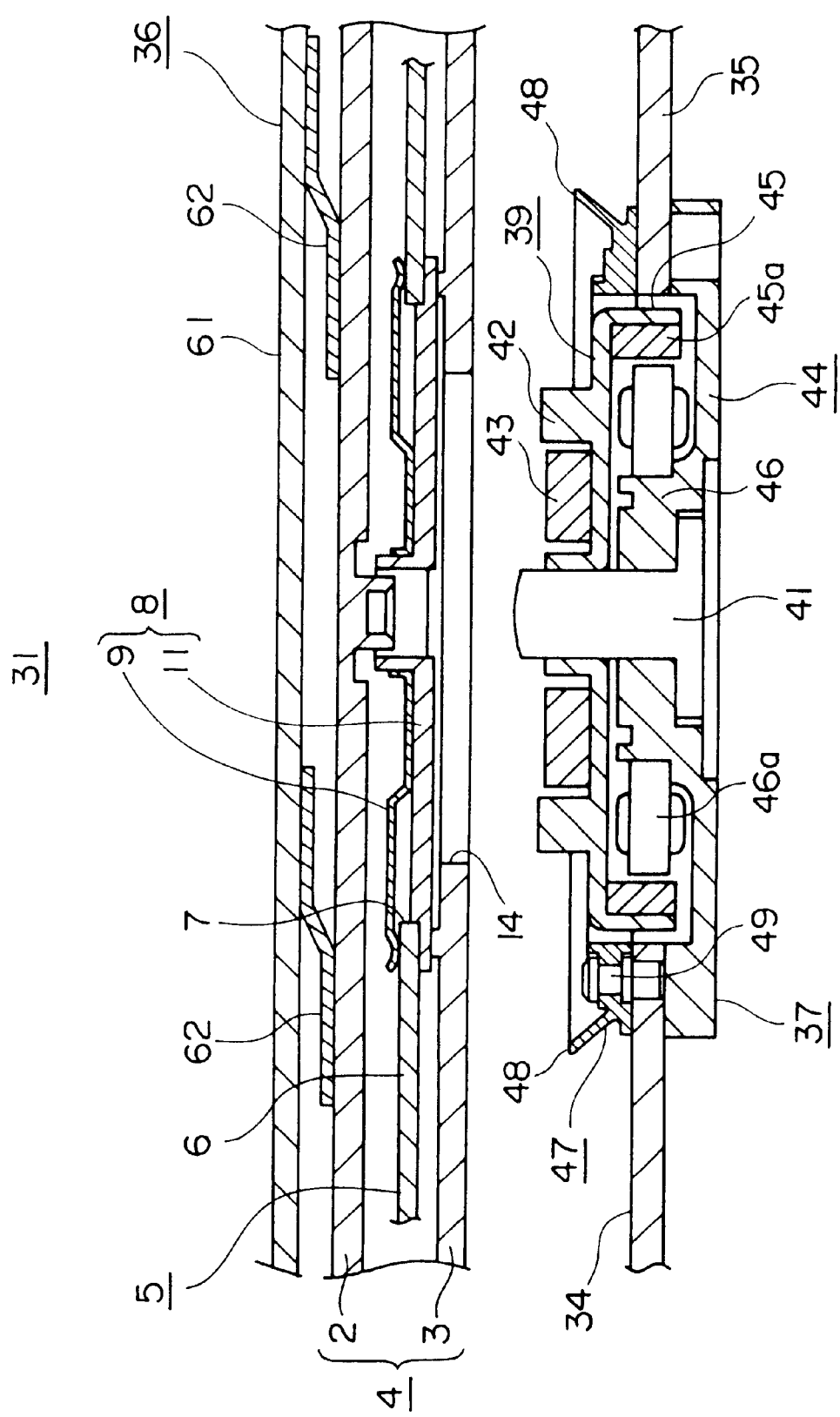
FIG. 6 is a sectional view of a disk drive.

FIG. 5 is a plan view of the disk drive. FIG. 6 is a sectional view of the disk drive.

As shown in FIG. 5 and FIG. 6, the drive body 32 constituting the disk drive 31 is provided with a base 35 constituting a carrier 34 in which the disk cartridge 1 is loaded and a cartridge holder 36 for holding the disk cartridge 1 to be loaded in the carrier 34.

The cartridge holder 36 loads the disk cartridge 1 in the carrier 34 by moving downward to the direction of the base 35 while holding the disk cartridge 1 when the disk cartridge 1 is inserted from the opening 33.

Here, on the base 35, a rotation mechanism 37 for rotating the hard disk 5 in the disk cartridge 1 and a magnetic head device 38 for recording or playing back information or a signal with respect to the hard disk 5 are arranged.

The rotation mechanism 37 has a disk table 39 rotatably supporting the hard disk 5 by the hub mechanism 8 as shown in FIG. 5 and FIG. 6.

The center portion of this disk table 39 is attached to a spindle shaft 14 inserted into the insertion holes 12 and 13 of the hub mechanism 8. Further, the disk table 39 is provided with a disk support portion 42 for supporting the hard disk 5 at the periphery of the spindle shaft 41.

On the inner circumferential side of this disk support portion 42, a ring-shaped magnet 43 for generating a uniform or substantially uniform magnetic field is arranged around the spindle shaft 41 so as to magnetically attract the hub mechanism 8 made of a magnetic material.

When the disk cartridge 1 is loaded in the carrier 34, the disk table 39 enters into the cartridge body 4 from the disk drive opening 14 formed in the bottom surface of the cartridge body 4 and magnetically attracts the hub mechanism 8 to thereby support the hard disk 5 so that it can rotate.

The disk table 39 rotates by a drive portion 44. This drive portion 44 has a rotor portion 45 provided suspended at the outer circumferential end of the disk table 39, a magnet 45a which is arranged at the inner surface of the rotor portion 45 and generates a magnetic field, and a drive coil 46a arranged at a stator 46 facing this magnet 45a.

When a drive current is supplied to the drive coil 46a, the drive portion 44 rotates the disk table 39 together with the rotor portion 45 by the action of that drive current and the magnetic field of the magnet 45a.

Figure 7:
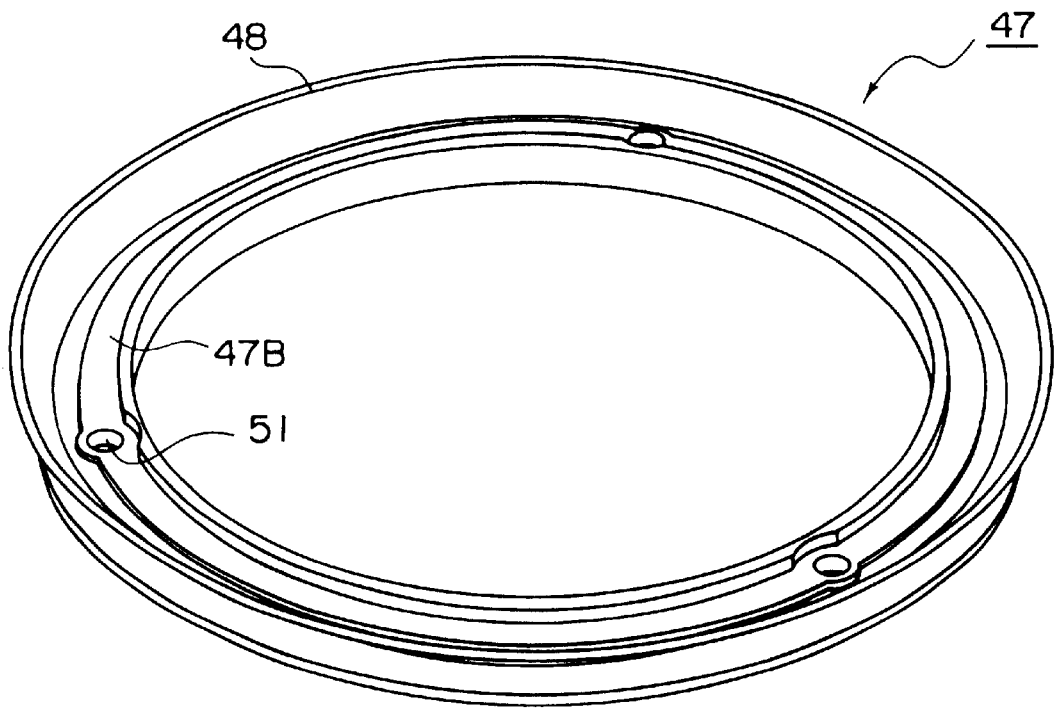
FIG. 7 is a perspective view of a sealing member.

FIG. 7 is a perspective view of a sealing member.

As shown in FIG. 7 and FIG. 6, the base 35 on which the rotation mechanism 37 is arranged has further arranged on it at the periphery of the rotation mechanism 37 a sealing member 47 with a front end in press-contact with the bottom surface of the cartridge body 4 when the disk cartridge 1 is loaded in the carrier 34.

The sealing member 47 is formed by a resilient member such as an elastomer or rubber and is attached to the base 35 so as to surround the rotation mechanism 37 (or disk table 39).

This sealing member 47 has an annular base portion (base end portion) 47B and a lip (press-contact portion) 48 projecting from this base portion 47B. The lip 48 is formed so as to flare outward from the base portion 47B toward the front end.

Figure 9:
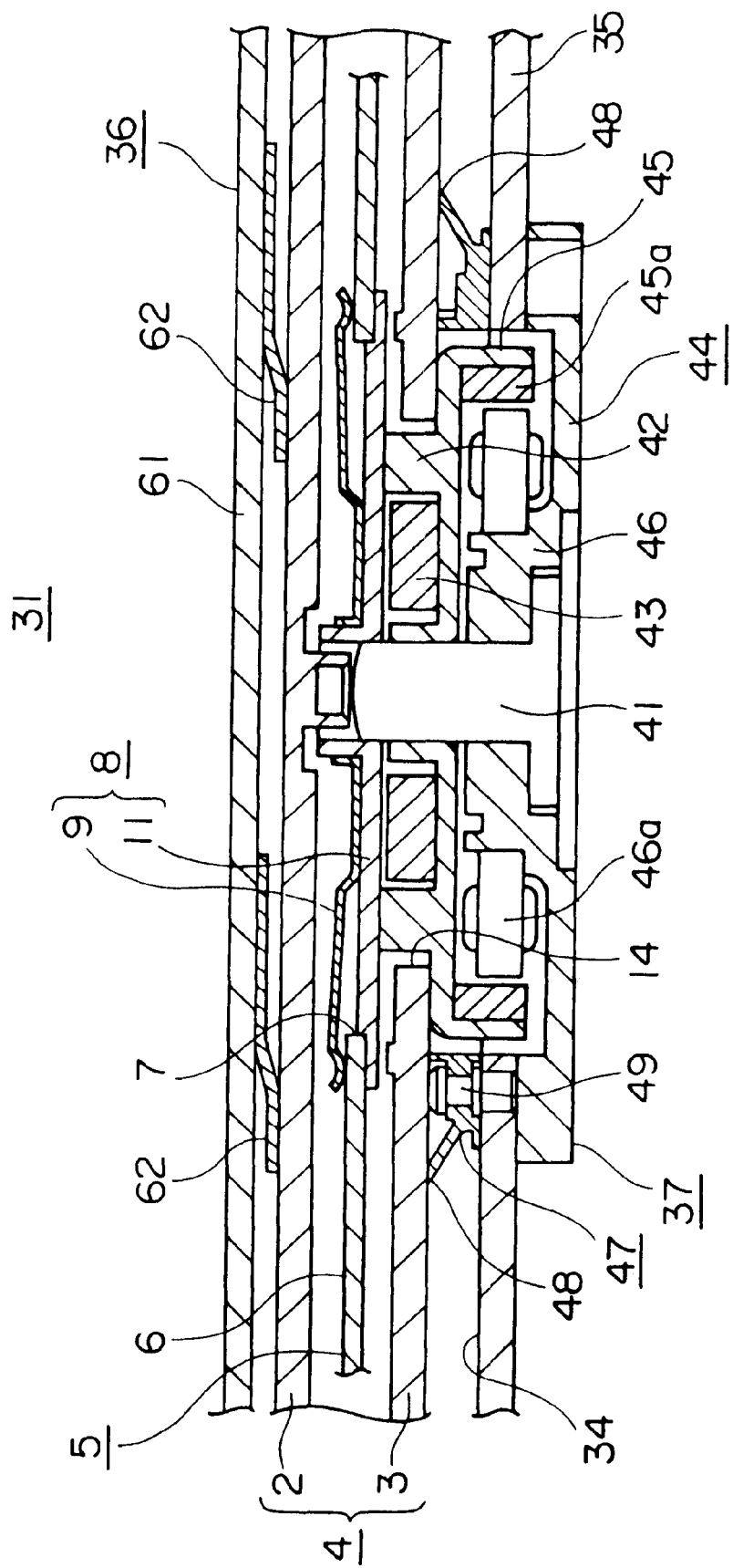
FIG. 9 is a sectional view of a disk drive in the state where a disk cartridge is loaded in a carrier.

FIG. 9 is a sectional view of a disk drive in a state where a disk cartridge is loaded in the carrier.

Figure 10:
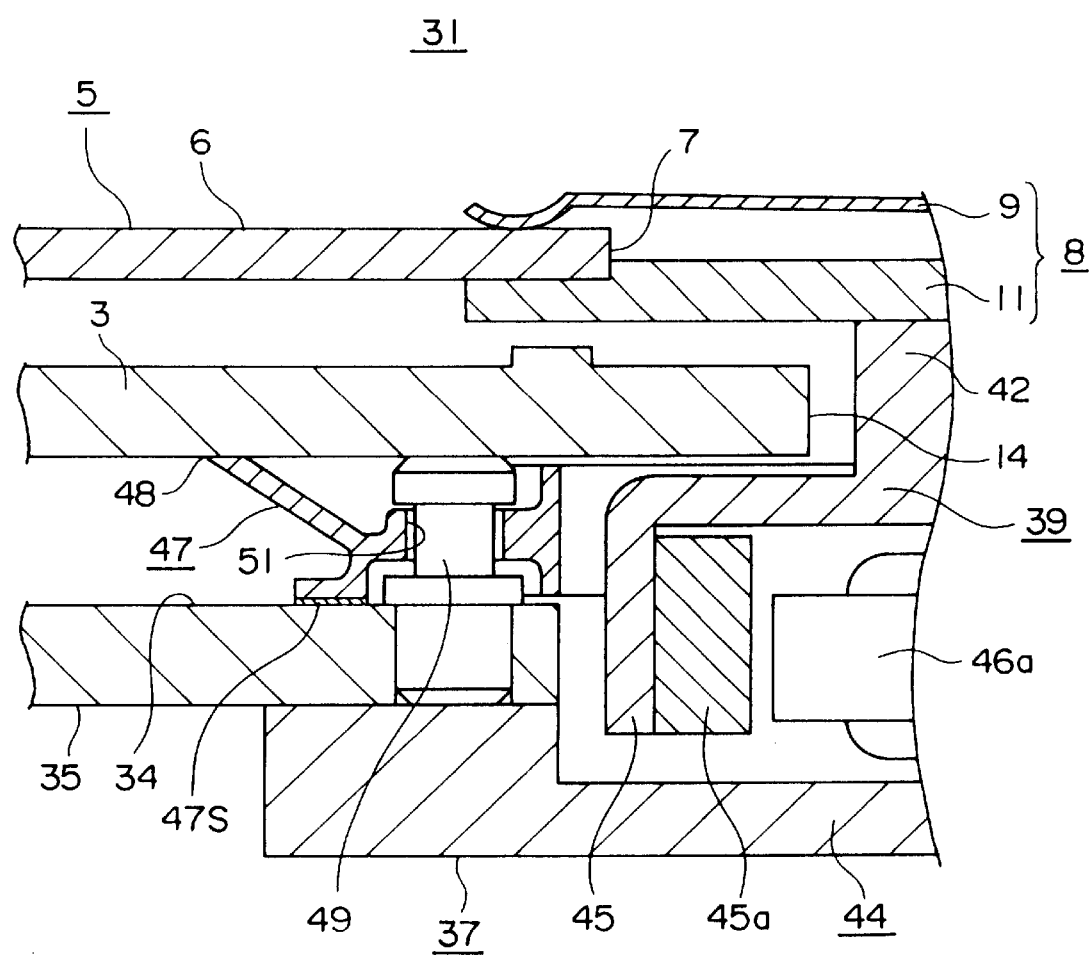
FIG. 10 is a sectional view of a disk drive around a sealing member when a disk cartridge is loaded in the carrier.

FIG. 10 is a sectional view of a disk drive around the sealing member when a disk cartridge is loaded in the carrier.

As shown in FIG. 9 and FIG. 10, when the disk cartridge 1 is loaded in the carrier 34, the lip 48 of the sealing member 47 is brought into press-contact with the periphery of the disk drive opening 14 at the bottom surface of the cartridge body 4, uniformly resiliently displaces in an outward flaring direction, and is made to closely contact the bottom surface of the cartridge body 4.

Further, the part of the lip 48 contacting the bottom surface of the cartridge body 4 is formed in substantially an arc state so that the front end smoothly slides along the bottom surface of the cartridge body 4 and so that the sealing property is improved. Note that the bottom surface of the base portion 47B of the sealing member 47 is bonded to the surface of the carrier 47 via a bonding layer 47S.

A top plate 61 of the cartridge holder 36 has attached to it pressing members 62 for pressing (pushing with a force) the disk cartridge 1 loaded in the carrier 34 to the base 35 side.

A load W by which the sealing member 47 resiliently displaces becomes:

$$W<P+S$$

where the pressing force of the pressing members 62 for pressing the disk cartridge 1 loaded in the carrier 34 to the base 35 side is P and the weight of the disk cartridge 1 is S.

Namely, by making the resiliently displacing load W of the sealing member 47 smaller than the load comprised of the weight S of the disk cartridge 1 plus the pressing force P of the pressing members 62, when the disk cartridge 1 is loaded in the carrier 34, the lip 48 is pressed against the bottom surface of the cartridge body 4 and resiliently displaces.

Figure 8:
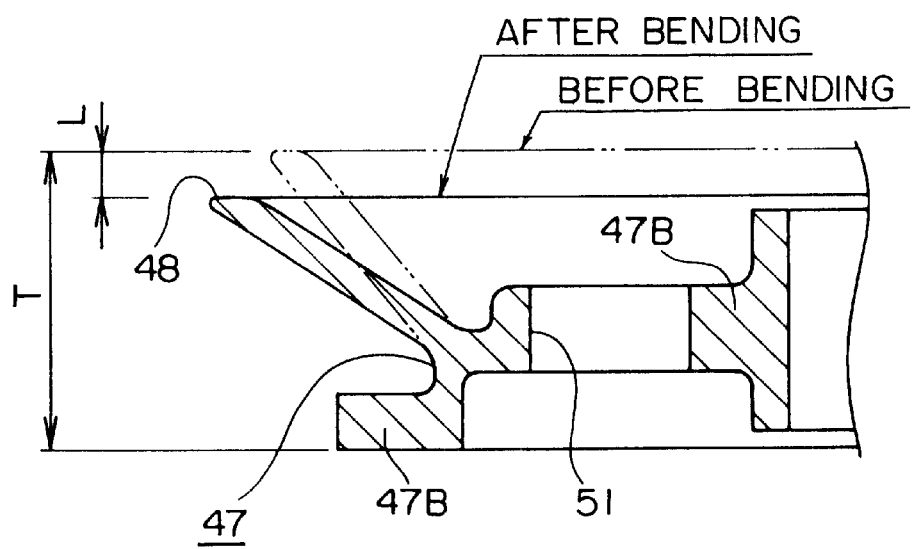
FIG. 8 is a sectional view for explaining the amount of elastic displacement of the sealing member.

FIG. 8 is a sectional view for explaining an amount of resilient displacement of the sealing member.

As shown in FIG. 8, when the thickness of the sealing member 47 from the base end to the front end is T, as one example, the resilient displacement amount L of the lip 48 is determined as:

$$L<T/3$$

Namely, by resiliently displacing the sealing member 47 to about ⅓ of the thickness of the sealing member 47, the lip 48 closely adheres to the bottom surface of the cartridge body 4. Here, the resilient displacement amount L of the sealing member is for example 5 mm or less and may also be about 1 mm or about 0.2 mm.

The sealing member 47 constituted in this way is attached to the base 35 by height positioning projections 49 for determination of the loading position of the disk cartridge 1 in the height direction.

Namely, the base portion 47B of the sealing member 47 is provided with a plurality of attachment holes 51 as through holes in the circumferential direction (refer to FIG. 7). By inserting the height positioning projections 49 into the attachment holes 51 for attaching the base 35, the sealing member 47 is attached to the base 35. Note that, the height positioning projections 49 are formed lower than the front end of the lip 48, whereby when the disk cartridge 1 is loaded in the carrier 34, the lip 48 press-contacts the cartridge body 4 and resiliently displaces in the outward flaring direction.

In the sealing member 47 as described above, when the disk cartridge 1 is loaded in the carrier 34, the lip 48 is pressed against the bottom surface of the cartridge body 4, whereby it resiliently displaces and flares outward.

By this, the lip 48 is made to closely contact the bottom surface of the cartridge body 4, the disk drive opening 14 formed at the bottom surface of the cartridge body 4 is sealed (closed or sealed up) by the rotation mechanism 37 and the sealing member 47, and the entry of dust and other foreign matter from the disk drive opening 14 into the cartridge body 4 is prevented.

Further, the base 35 has arranged on it the magnetic head device 38 for recording or playing back information or a signal with respect to the hard disk 5 accommodated in the cartridge body 4.

This magnetic head device 38 is provided with, as shown in FIG. 5, a pivoting arm 54 supporting a head slider 53 to the front end side of which a magnetic head element 52 is integrally attached and a voice coil motor 55 for the pivoting of the pivoting arm 54.

The pivoting arm 54 is supported in its middle portion at a support shaft 56 provided on the base 35 and is pivoted about the support shaft 56 in a direction indicated by an arrow R and a reverse arrow R in FIG. 5.

The head slider 53 is attached to the front end of the pivoting arm 54 so as to form a substantially right angle with respect to the pivoting arm 54 toward the carrier 34 side. A suspension 53S is formed so that it can resiliently displace in a direction moving toward or away from the hard disk 5.

The voice coil motor 55 is constituted by a drive coil 57 attached to the base end side of the pivoting arm 54 and by a magnetic circuit portion 58 comprising a magnet and a yoke arranged on the base 35 facing the drive coil 57.

This voice coil motor 55 pivots the pivoting arm 54 in the direction indicated by the arrow R and the reverse arrow R in FIG. 5 about the support shaft 56 by the action of the drive current supplied to the drive coil 57 and the magnetic field of the magnetic circuit portion 58.

The slider 53 (or magnetic head element 52) attached to the front end of the suspension 53S is operated so as to move across the inner and outer circumferences of the hard disk 5 by pivoting the pivoting arm 54 pivoting in the direction indicated by the arrow R and the reverse arrow R in FIG. 5.

The base 35 in which the rotation mechanism 37 and the magnetic head device 38 were assembled as described above has attached to it the cartridge holder 36 for holding the disk cartridge 1 inserted in the disk drive 31.

This cartridge holder 36 is provided with a top plate 61 and a pair of holding portions (not illustrated) for holding the side edges parallel to the insertion direction of the disk cartridge 1 into the disk drive 31.

When the disk cartridge is inserted into the drive body 32, the cartridge holder 36 holds the two side edges of the cartridge body 4 at the holding portion and, by moving downward to the direction of the base 35 next, loads the disk cartridge 1 in the carrier 34.

The top plate 61 of this cartridge holder 36, as shown in FIG. 6 and FIG. 9, has arranged on it a plurality of pressing members 62 for pressing the disk cartridge 1 loaded in the carrier 34 to the base 35 side.

The pressing members 62 comprise for example plate springs and are arranged on and attached to the top plate 61 inclined with respect to the top plate 61 with an angle enough to press the disk cartridge 1 held at the cartridge holder 36 against the base 35.

The pressing members 62 restrict the loading position of the disk cartridge 1 by pressing the disk cartridge 1 held at the cartridge holder 36 against the carrier 34 and push the bottom surface of the disk cartridge 1 against the lip 48 of the sealing member 47.

The disk drive 31 constituted as described above operates as follows when a disk cartridge 1 is inserted from the opening 33 formed in the front surface of the drive body 32.

When a disk cartridge 1 is inserted into the drive body 32, the two side edges of the disk cartridge 1 are held by the holding portion of the cartridge holder 36.

Next, the cartridge holder 36 moves downward to the direction of the base 35 to thereby load the disk cartridge 1 in the carrier 34.

At this time, in the shutter member 16 of the disk cartridge 1, the engagement piece 26 moves to the back wall 4c side of the cartridge body 4 by the engagement of the shutter opening mechanism of the disk drive 31 side with the engagement piece 26 positioned close to the outside of the side wall 4b of the cartridge body 4. The shutter member 16 is pivoted to the direction indicated by the reverse arrow A in FIG. 4 and opens the disk drive opening 14 and the recording and playback opening 15.

Then, as shown in FIG. 9, the rotation mechanism 37 of the disk drive 31 side enters from the disk drive opening 14 and magnetically attracts the hub mechanism 8 by a magnet 43 of the rotation mechanism 37, whereby the rotation mechanism 37 clamps the hard disk 5. Further, the magnetic head device 38 enters from the recording and playback opening 15.

In this state, the pressing members 62 press the disk cartridge 1 held at the cartridge holder 36 against the carrier 34 to thereby restrict the loading position of the disk cartridge 1 and press the bottom surface of the cartridge body 4 against the lip 48 of the sealing member 47.

Then, as shown in FIG. 10, the sealing member 47 resiliently displaces and flares outward by the lip 48 being pressed against the bottom surface of the cartridge body 4. By this, the lip 48 is made to closely contact the bottom surface of the cartridge body 4, the disk drive opening 14 formed in the bottom surface of the cartridge body 4 is sealed by the rotation mechanism 37 and the sealing member 47, and thus entry of dust and other foreign matter into the cartridge body 4 from the disk drive opening 14 is prevented.

Then, when the drive portion 44 of the rotation mechanism 37 is driven and the hard disk 5 rotates, an air flow is formed between the inner surface of the cartridge body 4 and the hard disk 5 and an air pressure sucking the air from a clearance between the disk drive opening 14 and the rotation mechanism 37 (or the disk table 39) is generated.

On the periphery of the disk drive opening 14, however, the lip 48 of the sealing member 47 is in press-contact with the bottom surface of the cartridge body 4, therefore this air flow is shut off by the sealing member 47 and the sucking of the air outside of the sealing member 47 from the disk drive opening 14 is prevented.

Accordingly, in the cartridge body 4, the entry of air containing the dust in the drive body 32 into the cartridge body 4 can be prevented, and deposition of dust and other foreign matter to the hard disk 5 in the cartridge body 4 can be prevented.

The magnetic head element 52 constituting the magnetic head device 38 floats by about several tens of nanometers when the hard disk 5 rotates at a high speed. In this floating state, the magnetic head element 52 is operated so as to move across the diameter direction of the hard disk 5.

At this time, in the cartridge body 4, since the entry of the dust etc. into the cartridge body 4 is prevented by the sealing member 47, collision of dust etc. deposited on the hard disk 5 and the magnetic head element 52 can be eliminated, the floating state of the magnetic head element 52 from the hard disk 5 becomes stable, and thus recording or playback of information or a signal can be reliably carried out.

Further, it is also possible to constitute the disk drive to which the present invention is applied as follows. Note that the same members as those of the disk drive 31 mentioned above are given the same reference numerals, and details will be appropriately omitted.

Figure 11:
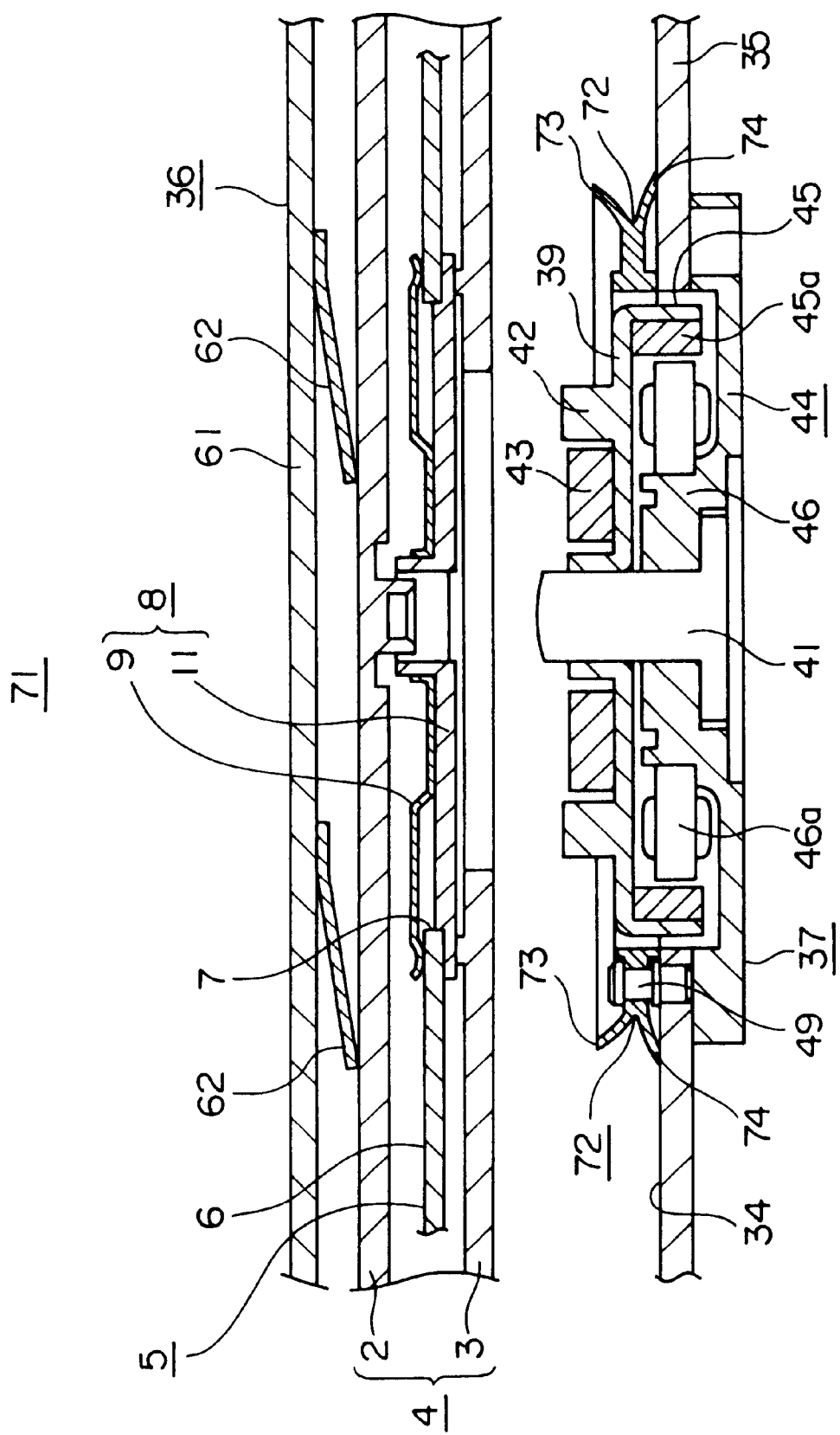
FIG. 11 is a sectional view of a modification of the disk drive.

FIG. 11 is a sectional view of a modification of the disk drive 31. As shown in FIG. 11, in this disk drive 71, lips 73 and 74 of a sealing member 72 are provided vertically symmetrically.

Figure 12:
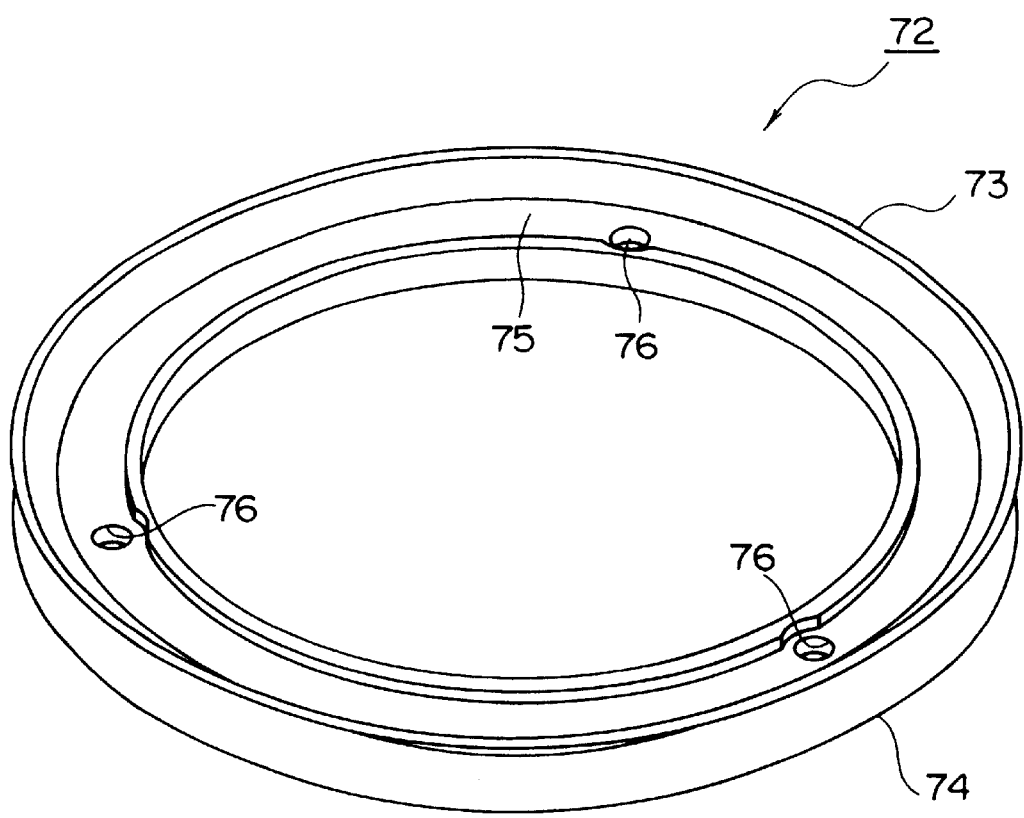
FIG. 12 is a perspective view of a sealing member.

FIG. 12 is a perspective view of the sealing member.

As shown in FIG. 12 and FIG. 11, the sealing member 72 is formed into a ring shape by a resilient member such as an elastomer or rubber and is arranged on the base 35 so as to surround the rotation mechanism 37 (or disk table 39).

This sealing member 72 has an annular base portion 75 and first and second lips projecting from this base portion 75. The first lip 73 projects from the top side of the base portion 75, and the second lip 74 projects from the bottom side of the base portion 75. The first and second lips 73 and 74 are shaped flaring outward from the base portion 75 toward the front end portion.

In this way, in the sealing member 72, the first lip 73 is formed on upper side from the center portion in the thickness direction, and the second lip 74 is formed on the lower side.

The first lip 73 is brought into press-contact with the periphery of the disk drive opening 14 at the bottom surface of the cartridge body 4 and formed so as to flare outward from the center portion toward the front end in the thickness direction.

When the disk cartridge 1 is loaded in the carrier 34, a load comprised of the weight of the disk cartridge 1 and the pressing force of the pressing members 62 attached to the top plate 61 of the cartridge holder 36 is applied to the first and second lips 73 and 74, whereby they uniformly resiliently displace in the outward flaring direction and are brought into press-contact with the bottom surface of the cartridge body 4 and the base 35.

Further, in the first and second lips 73 and 74, parts in contact with the bottom surface of the cartridge body 4 are formed to substantially an arc shape so that the front ends smoothly move along to the bottom surface of the cartridge body 4 and the base 35.

In the sealing member 72, since the first lip 73 is pushed against the bottom surface of the cartridge body 4 and the second lip 74 is pushed against the base 35, the sealing member 72 can be attached to the base 35 without bonding, so it is possible to reduce the trouble of attachment and there are cost advantages.

The sealing member 72 constituted in this way is attached to the base 35 by the height positioning projections 49 for positioning the loading position in the height direction of the disk cartridge 1 to be loaded in the carrier 34.

In the sealing member 72, the attachment piece 75 is formed inward from the center portion in the thickness direction. This attachment piece 75 constitutes the base portion. This attachment piece 75 is provided with a plurality of attachment holes 76 in a circumferential direction (refer to FIG. 12).

The attachment holes 76, as shown in FIG. 11, have inserted into them the height positioning projections 49 for positioning the loading position of the disk cartridge 1 in the thickness direction. The sealing member 72 is attached so that it can move slightly in the height direction of the height positioning projections 49.

The disk drive 71 constituted as described above operates as follows when a disk cartridge 1 is inserted from the opening formed in the front surface of the drive body as shown in FIG. 1.

When a disk cartridge 1 is inserted into the drive body, the disk cartridge 1 is held at its two side edges by the holding portion of the cartridge holder 36.

Next, the cartridge holder 36 moves downward in the direction of the base 35 to thereby load the disk cartridge 1 in the carrier 34. At this time, the shutter member 16 of the disk cartridge 1 is pivoted to the direction indicated by the reverse arrow A in FIG. 4 and opens the disk drive opening 14 and the recording and playback opening 15.

Figure 13:
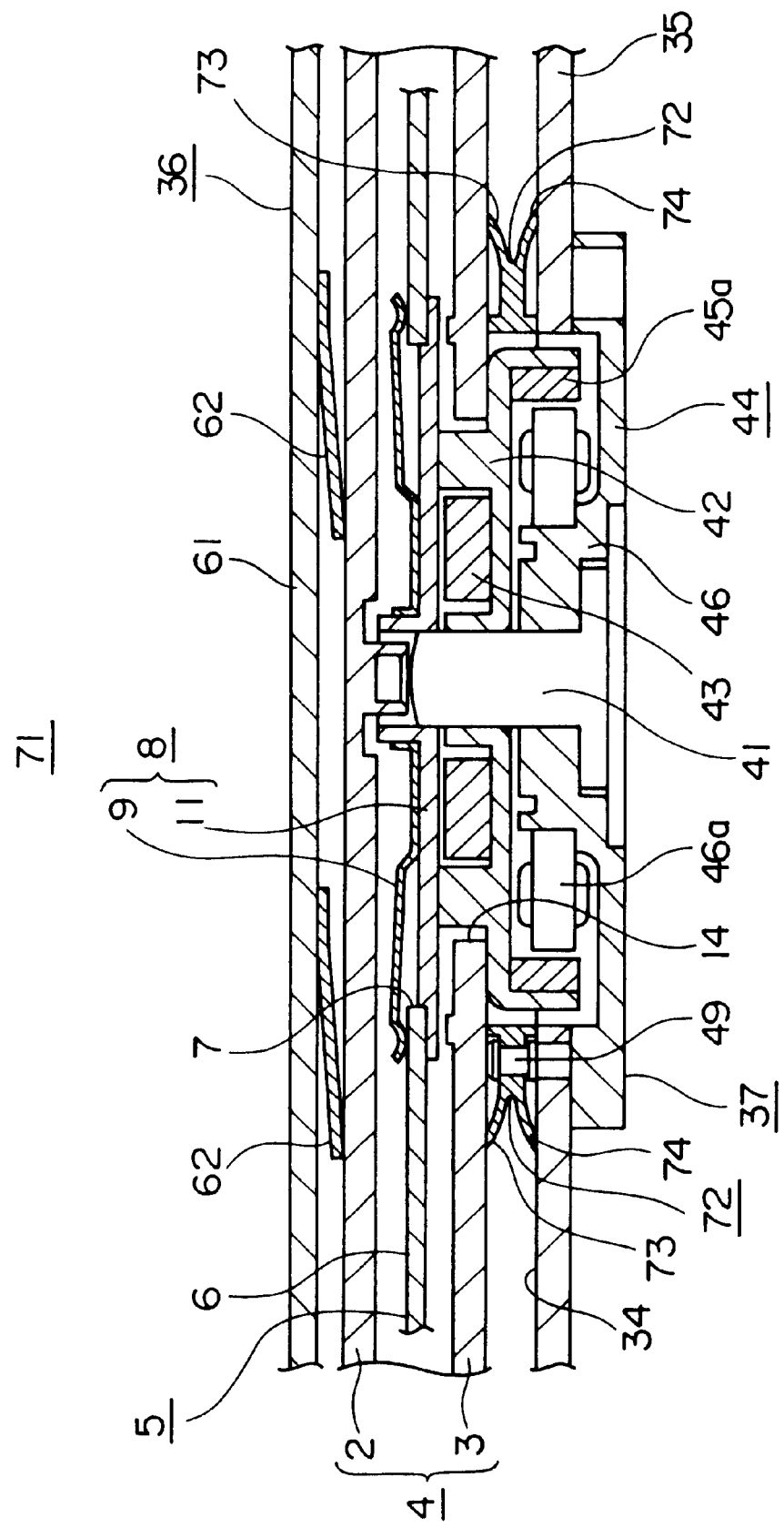
FIG. 13 is a sectional view of a disk drive in the state where a disk cartridge is loaded in a carrier.

Then, as shown in FIG. 13, the rotation mechanism 37 of the disk drive 71 side enters from the disk drive opening 14 and magnetically attracts the hub mechanism 8 by the magnet 43 attached to the disk table 39, whereby the disk table 39 clamps the hard disk 5.

FIG. 13 is a sectional view of the disk drive in the state where the disk cartridge is loaded in the carrier.

As shown in FIG. 13, the pressing members 62 press the disk cartridge 1 held at the cartridge holder 36 against the carrier 34 to thereby restrict the loading position of the disk cartridge 1 and press the bottom surface of the disk cartridge 1 against the first lip 73 of the sealing member 72.

Then, the sealing member 72 is pressed against the disk cartridge 1 to thereby slightly move downward along the height positioning projections 49, and the second lip 74 is brought into press-contact with the base 35.

Figure 14:
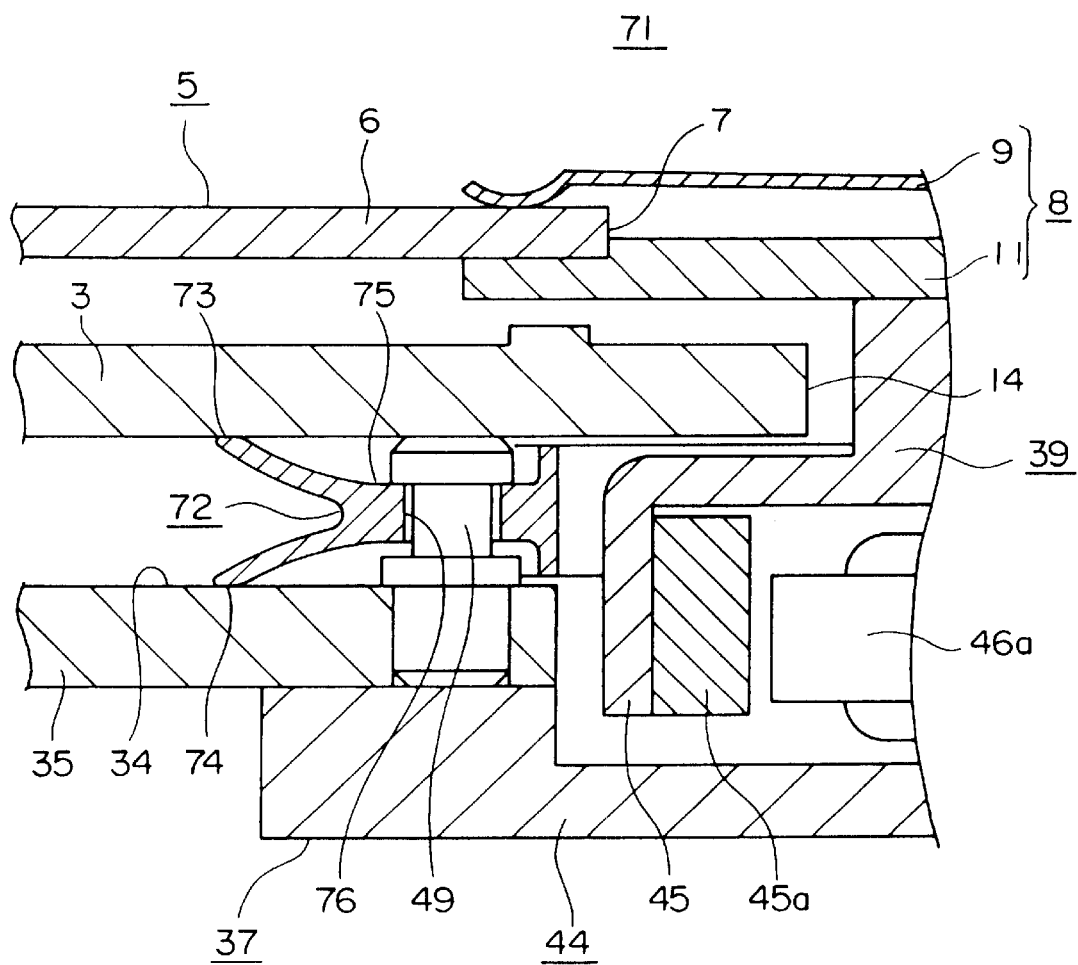
FIG. 14 is a sectional view of a disk drive around a sealing member when a disk cartridge is loaded in the carrier.

FIG. 14 is a sectional view of the disk drive around the sealing member when the disk cartridge is loaded in the carrier.

As shown in FIG. 14, the sealing member 72 is sandwiched between the disk cartridge 1 and the base 35. The first lip 73 is pressed against the bottom surface of the cartridge body 4 to thereby resiliently displace in the outward flaring direction and made to closely contact the bottom surface of the cartridge body 4, while the second lip 74 resiliently displaces in the outward flaring direction and is made to closely contact the base 35.

By this, the disk drive opening 14 formed in the bottom surface of the cartridge body 4 is sealed by the carrier 34, the rotation mechanism 37, and the sealing member 72, thus the entry of dust and other foreign matter from the disk drive opening 14 into the cartridge body 4 is prevented.

Then, when the drive portion 44 of the rotation mechanism 37 is driven and the hard disk 5 rotates, an air flow is formed between the inner surface of the cartridge body 4 and the hard disk 5 and air pressure sucking the air from the clearance between the disk drive opening 14 and the rotation mechanism 37 is generated.

On the periphery of the disk drive opening 14, however, the first lip 73 of the sealing member 72 is brought into press-contact with the bottom surface of the cartridge body 4, and the second lip 74 is brought into press-contact with the base 35, therefore this air flow is shut off by the sealing member 72 and the sucking of the air outside of the sealing member 72 from the disk drive opening 14 is prevented.

Accordingly, in the cartridge body 4, the entry of air containing dust in the drive body (or cartridge holder 36) into the cartridge body 4 can be prevented, and the deposition dust and other foreign matter to the hard disk 5 in the cartridge body 4 can be prevented.

Further, the collision of the dust etc. deposited on the hard disk 5 and the magnetic head element 52 can be eliminated. The magnetic head element 52 becomes stable in its floating state from the hard disk 5 and thus can reliably record or play back information or a signal.

Further, the disk drive to which the present invention is applied can also be constituted as follows. Note that the same members as those of the disk drive 31 mentioned above are given the same reference numerals, and details will be appropriately omitted.

Figure 15:
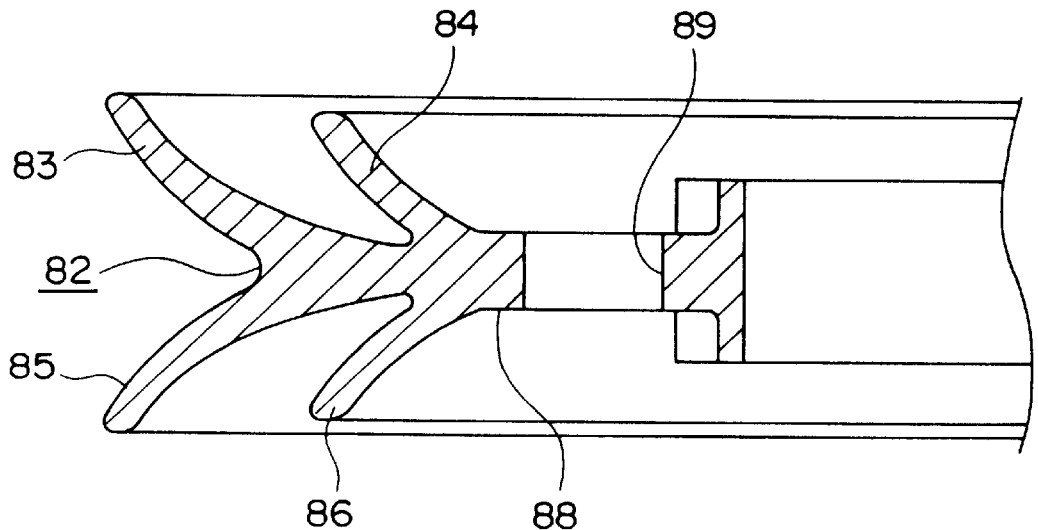
FIG. 15 is a sectional view of a sealing member having lips formed vertically symmetrically.

FIG. 15 is a sectional view of a sealing member in which lips are provided vertically symmetrically.

Figure 16:
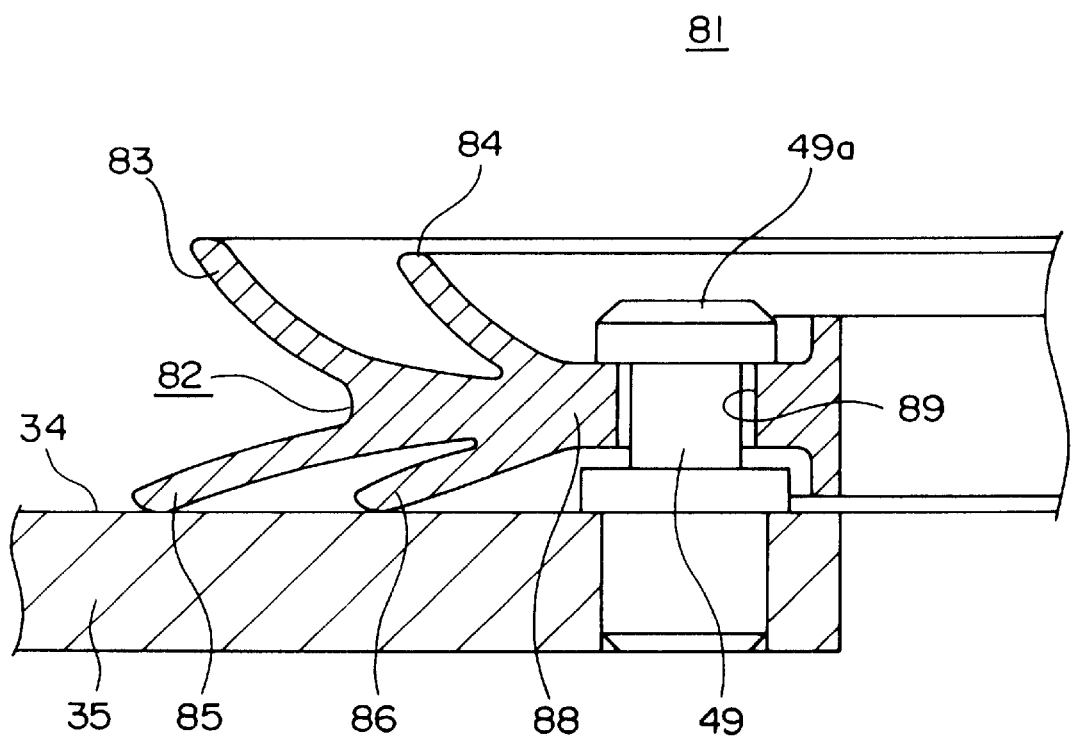
FIG. 16 is a sectional view of the state where the sealing member shown in FIG. 15 is attached to a height positioning projection.

FIG. 16 is a schematic sectional view of a disk drive around a height positioning projection and shows the state where the sealing member of FIG. 15 is attached to the height positioning projections.

As shown in FIG. 16 and FIG. 15, in this disk drive 81, in a sealing member 82, lips 83 to 86 are formed concentrically. A plurality of lips having different diameters are vertically symmetrically formed.

In this way, the sealing member 82 has an annular base portion 88 and lips 83 to 86 projecting from this base portion 88 and flaring outwardly. The lips 83 and 84 project from the top surface side of the base portion 88, and the lips 85 and 86 project from the bottom surface side of the base portion 88.

The sealing member 82 is formed to a ring shape by a resilient member such as an elastomer or rubber and is arranged on the base 35 so as to surround the rotation mechanism 37 (or the disk table).

In this sealing member 82, the first lip 83 and the second lip 84 having different diameters are formed concentrically from the center portion toward the upper side in the thickness direction, while the third lip 85 and the fourth lip 86 are formed from the center portion toward the lower side in the thickness direction.

The first and the second lips 83 and 84 formed from the center portion toward the upper side in the thickness direction of the sealing member 82 are brought into press-contact with the periphery of the disk drive opening 14 in the bottom surface of the cartridge body 4.

The first lip 83 and the second lip 84 are formed concentrically in a ring shape. The first lip 83 is provided on the outer circumferential side (or outward side) of the second lip 84. The first and second press-contacting portions 83 and 84 are formed so as to flare outward toward the front end side.

The first lip 83 is formed longer than the second lip 84, and the front end is made higher than the front end of the second lip 84. In this way, the first lip 83 is formed longer than the second lip 84, and the front end is made higher than the front end of the second lip 84, whereby the pressing force for pressing against the bottom surface of the cartridge body 4 is made the same as the pressing force of the second lip 84.

Note that by changing the thickness of the first lip 83 and the second lip 84, it is possible to make the pressing forces the same. Also, by changing the inclination angle of the lips, it is possible to make the pressing forces the same.

In the first and second pressing portions 83 and 84, parts in contact with the bottom surface of the cartridge body 4 are formed to substantially an arc shape so that the front ends smoothly move along the bottom surface of the cartridge body 4.

The third and fourth lips 85 and 86 formed from the center portion toward the lower side in the thickness direction of the sealing member 82 are brought into press-contact with the surface of the base 35, i.e., the periphery of the rotation mechanism 37 (or the disk table).

The third and fourth lips 85 and 86 are formed concentrically in a ring shape. The third lip 85 is provided on the outer circumference of the fourth lip 86. The third and fourth lips 85 and 86 are formed flaring outward toward the front end side.

The third lip 85 is formed longer than the fourth lip 86, and its front end is made higher than the front end of the fourth lip 86. By having the third lip 85 formed longer than the fourth lip 86 and its front end made higher than the front end of the fourth lip 86 in this way, the pressing force for pressing against the periphery of the rotation mechanism 37 of the base 35 is made the same as the pressing force of the fourth lip 86.

Note that by changing the thickness of the third lip 85 and the fourth lip 86, it is possible to make the pressing forces the same. Also, by changing the inclination angle of the lips, it is possible to make the pressing forces the same.

In the third and fourth lips 85 and 86, parts in contact with the base 35 are formed to substantially an arc shape so that the front ends smoothly move along the base 35.

This sealing member 82 is attached to the base 35 by the height positioning projections 49 for positioning the loading position of the disk cartridge 1 in the height direction.

Namely, in the sealing member 82, the attachment piece 88 is formed inwardly from the center portion in the thickness direction. This attachment piece 88 constitutes the base portion. The attachment piece 88 is provided with a plurality of attachment holes 89 in the circumferential direction.

The attachment holes 89, as shown in FIG. 16, have inserted into them the height positioning projections 49 for positioning the loading position of the disk cartridge 1 in the thickness direction. By engagement of attachment pieces 88 on the periphery of the attachment holes 89 with flange portions 49a comprised of the heads formed at the front ends of the height positioning projections 49, the sealing member 82 is attached in the state positioned in the height direction.

At this time, the third and fourth lips 85 and 86 resiliently displace in the outward flaring direction and are brought into press-contact with the base 35 with the same pressing force.

By this, the third and fourth lips 85 and 86 prevent the entry of dust, etc. into the cartridge body 4 together with the air flow created due to the rotation of the hard disk 5 when the hard disk 5 rotates by the rotation mechanism 37.

Further, the fourth lip 86 is provided on the inner circumferential side of the third lip 85, whereby a dual structure is exhibited. Therefore even if one lip is broken, the sealing property of the disk drive opening 14 can be maintained. Thus, the improvement of the durability and the improvement of the reliability are possible.

When a disk cartridge 1 is loaded in the carrier 34, the load comprised of the weight of the disk cartridge 1 and the pressing force of the pressing members 62 attached to the top plate 61 of the cartridge holder 36 is applied to the disk drive 81 provided with such a sealing member 82, whereby the first and second lips 83 and 84 uniformly resiliently displace in the outward flaring direction and are brought into press-contact with the bottom surface of the cartridge body 4 and are made to closely contact the bottom surface of the cartridge body 4.

By this, the drive opening 14 formed in the bottom surface of the cartridge body 4 is sealed by the carrier 34, the rotation mechanism 37, and the sealing member 82, and thus the entry of dust and other foreign matter from the drive opening 14 into the cartridge body 4 is prevented.

Then, when the drive portion 44 of the rotation mechanism 37 is driven and the hard disk 5 rotates, an air flow is formed between the inner surface of the cartridge body 4 and the hard disk 5 and air pressure sucking the air from the clearance between the drive opening 14 and the rotation mechanism 37 is generated.

On the periphery (or the peripheral portion) of the drive opening 14, however, the first and second lips 83 and 84 of the sealing member 82 are brought into press-contact with the bottom surface of the cartridge body 4, and the third and fourth lips 85 and 86 are brought into press-contact with the base 35, therefore this air flow is shut off by the sealing member 82, and the sucking of the air outside of the sealing member 82 from the drive opening 14 is prevented.

Accordingly, in the cartridge body 4, the entry of air containing dust in the drive body into the cartridge body 4 can be prevented, and the deposition of dust and other foreign matter on the hard disk 5 in the cartridge body 4 can be prevented.

Further, the collision of the dust etc. deposited on the hard disk 5 and the magnetic head element 52 can be eliminated. The magnetic head element 52 becomes stable its floating state from the hard disk 5 and thus can reliably record or play back the information or signal.

The disk drive to which the present invention is applied can also be constituted as follows. Note that the same members as those of the disk drive 31 mentioned above are given the same reference numerals, and details will be appropriately omitted.

Figure 17:
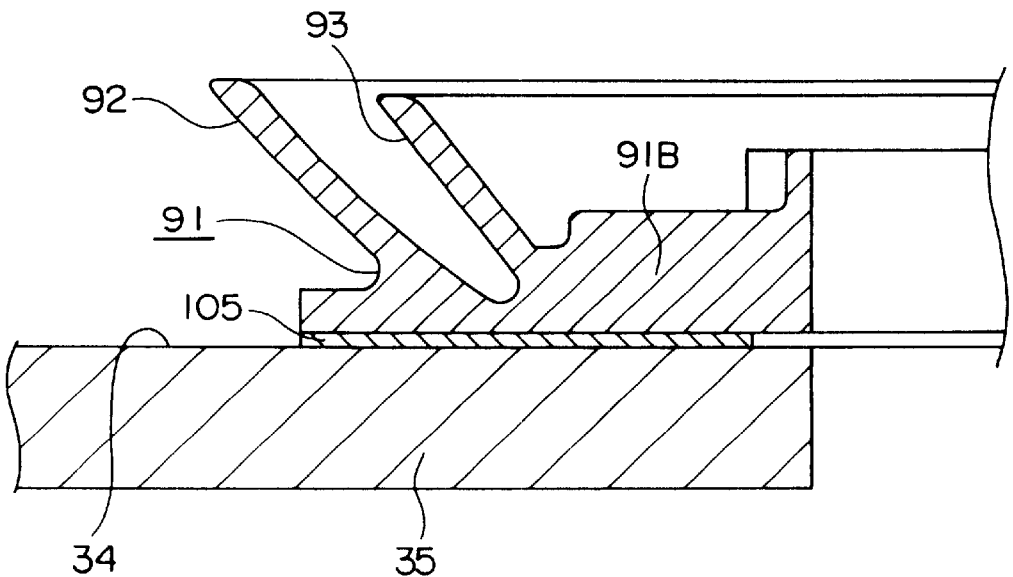
FIG. 17 is a sectional view of the state of attachment of a sealing member having a plurality of concentric lips.

FIG. 17 is a sectional view of the state of attachment of the sealing member.

As shown in FIG. 17, this sealing member 91 attached to the disk drive has a plurality of concentric lips having different diameters.

The sealing member 91 is formed to a ring shape by a resilient member such as an elastomer or rubber and is arranged on the base 35 so as to surround the rotation mechanism 37 (or the disk table).

The sealing member 91 has an annular base portion 91B and lips 92 and 93 projecting from this base portion 91B and flaring outward. The lips 92 and 93 are projected from one of the top and bottom surfaces of the base portion 91B. In this sealing member 91, a first lip 92 and a second lip 93 brought into press-contact with the periphery (or the peripheral portion) of the disk drive opening 14 at the bottom surface of the cartridge body 4 are formed.

The first lip 92 and the second lip 93 are formed concentrically. The first lip 92 is formed on the outer circumferential side of the second lip 93.

Both of the first and second press-contacting portions 92 and 93 are formed so as to flare outward and are formed so that the front ends are brought into press-contact with the bottom surface of the cartridge body 4 and resiliently displace in the outward flaring direction when the disk cartridge 1 is loaded in the carrier 34.

The first lip 92 is formed longer than the second lip 93, and its front end is made higher than the front end of the second lip 93. By making the first lip 92 be formed longer than the second lip 93 and its front end made higher than the front end of the second lip 93 in this way, the pressing force for pressing against the bottom surface of the cartridge body 4 is made the same as the pressing force of the second lip 93.

Note that, by changing the thickness of the first lip 92 and the second lip 93, it is possible to make the pressing forces the same. Also, by changing the inclination angle of the lips, it is possible to make the pressing forces the same.

Further, in the first and second lips 92 and 93, parts in contact with the bottom surface of the cartridge body 4 are formed to substantially an arc shape so that the front ends smoothly move along the bottom surface of the cartridge body 4.

Then, this sealing member 91 is attached to the height positioning projections 49 or the bottom surface of the base portion 91B is attached to the base 35 via an adhesive 105.

When a disk cartridge 1 is loaded in the carrier 34, the disk drive provided with the sealing member 91 as described above is subjected to a load comprising the weight of the disk cartridge 1 and the pressing force of the pressing members 62 attached to the top plate 61 of the cartridge holder 36, whereby the first and second lips 92 and 93 resiliently displace uniformly in the outward flaring direction, are brought into press-contact with the bottom surface of the cartridge body 4, and are made to closely contact the bottom surface of the cartridge body 4.

By this, the drive opening 14 at the bottom surface of the cartridge body 4 is sealed by the carrier 34, the rotation mechanism 37, and the sealing member 91, and the entry of dust and other foreign matter from the drive opening 14 into the cartridge body 4 is prevented.

When the drive portion 44 of the rotation mechanism 37 is driven and the hard disk 5 rotates, an air flow is formed between the inner surface of the cartridge body 4 and the hard disk 5 and air pressure sucking the air from the clearance between the drive opening 14 and the rotation mechanism 37 is generated.

On the periphery (the peripheral portion) of the drive opening 14, however, the first and second lips 92 and 93 of the sealing member 91 are brought into press-contact with the bottom surface of the cartridge body 4, therefore this air flow is shut off by the sealing member 91, and the sucking of air outside of the sealing member 91 from the drive opening 14 is prevented.

Accordingly, in the cartridge body 4, the entry of air containing dust in the drive body into the cartridge body 4 can be prevented, and the deposition of dust and other foreign matter on the hard disk 5 in the cartridge body 4 can be prevented.

Further, the collision of the dust etc. deposited on the hard disk 5 and the magnetic head element 52 can be eliminated. The magnetic head element 52 becomes stable in its floating state from the hard disk 5 and thus can reliably record or play back the information or signal.

Further, it is also possible to constitute the disk drive to which the present invention is applied as follows. Note that the same members as those of the disk drive 31 mentioned above are given the same reference numerals, and details will be appropriately omitted.

Figure 18:
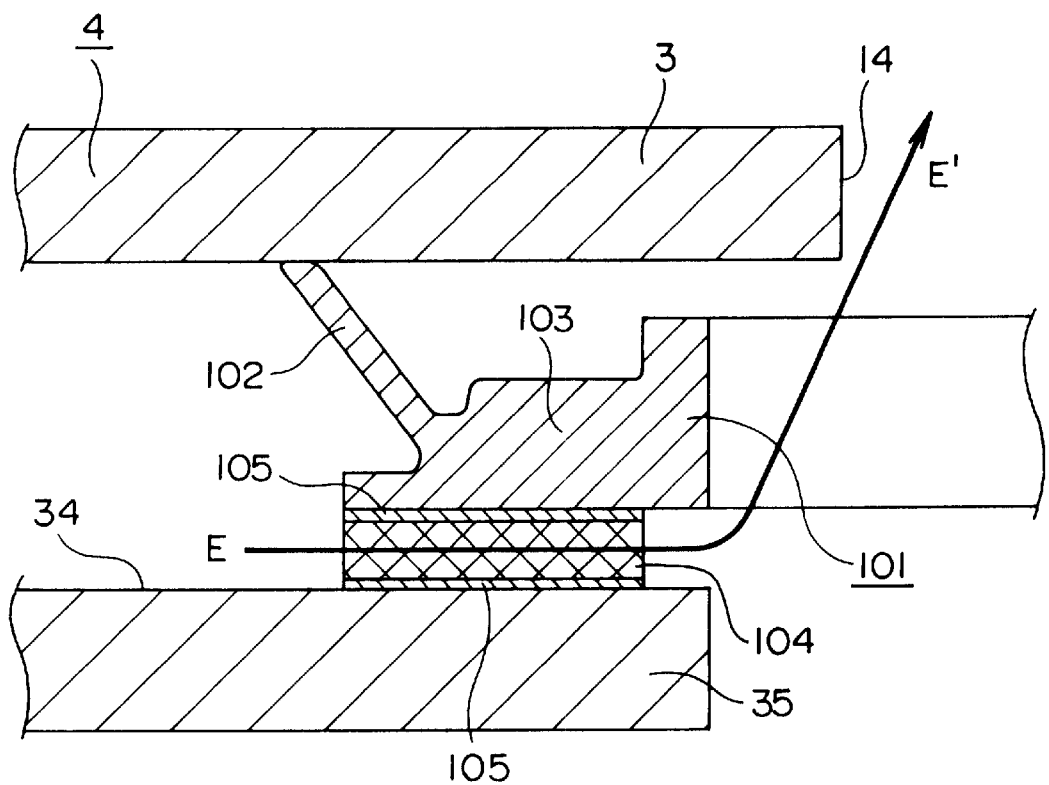
FIG. 18 is a sectional view of an example in which the sealing member is provided on a filter for removing dust etc. contained in the air.

FIG. 18 is a sectional view of an example in which the sealing member is provided on a filter.

In this disk drive, a sealing member 101 is arranged on a filter 104 for filtering air E to eliminate the dust etc. contained in the related air E.

The sealing member 101 used for this disk drive is arranged on the base 35 so as to surround the rotation mechanism 37 (or the disk table).

The sealing member 101 is formed in a ring shape by a resilient member such as an elastomer or rubber. A lip 102 is formed so as to flare outward from a base portion (base end portion) 103 toward the front end.

When a disk cartridge 1 is loaded in the carrier 34, the lip 102 is brought into press-contact with the periphery (or the peripheral portion) of the disk drive opening 14 at the bottom surface of the cartridge body 4, uniformly resiliently displaces in the outwardly flaring direction, and is made to closely contact the bottom surface of the cartridge body 4.

Further, the part of the lip 102 in contact with the bottom surface of the cartridge body 4 is formed to substantially an arc shape so that the front end can smoothly move along the bottom surface of the cartridge body 4.

At the base end 103 of the sealing member 101 is attached a ring-like filter 104 for eliminating the dust etc. contained in the air flow generated at the time of rotation of the hard disk 5 so as to be sandwiched between the sealing member 101 and the base 35. This filter 104 is formed by a material having a large pressure loss and is formed so as not to pass air therethrough when the hard disk 5 is not rotating, but to pass the air E' from which the dust etc. has been eliminated when the hard disk 5 rotates and an air flow is generated.

The filter 104 is attached to the base end 103 of the sealing member 101 and the base 34 by an adhesive 105 or the like. The sealing member 101 to which the filter 104 is attached is then attached to the height positioning projections 49, or the bottom surface of the base end 103 is attached by being bonded to the base 35 via the filter 104.

The disk drive provided with the sealing member 101 to which the filter 104 is attached as described above is subjected to a load comprised of the weight of the disk cartridge 1 and the pressing force of the pressing members 62 attached to the top plate 61 of the cartridge holder 36 when the disk cartridge 1 is loaded in the carrier 34, whereby the lip 102 uniformly resiliently displaces in the outward flaring direction, is brought into press-contact with the bottom surface of the cartridge body 4, and is made to closely contact the bottom surface of the cartridge body 4.

By this, the drive opening 14 at the bottom surface of the cartridge body 4 is substantially sealed by the carrier 34, rotation mechanism 37, and the sealing member 101, and the entry of dust and other foreign matter from the drive opening 14 into the cartridge body 4 is prevented.

Then, when the drive portion 44 of the rotation mechanism 37 is driven and the hard disk 5 rotates, an air flow is formed between the inner surface of the cartridge body 4 and the hard disk 5, and air pressure sucking the air E from the clearance between the drive opening 14 and the rotation mechanism 37 is generated.

That is, the air E on outside of the sealing member 101 is cleaned of dust etc. by the filter 104 to be made the clean air E' and flows into the cartridge body 4.

Accordingly, the flow of the air E containing the dust into the cartridge body 4 can be prevented, and the deposition of dust and other foreign matter on the hard disk 5 can be prevented.

Further, the collision of the dust etc. deposited on the hard disk 5 and the magnetic head element 52 can be eliminated. The magnetic head element 52 becomes stable in its floating state from the hard disk 5 and thus can reliably record or play back the information or signal.

Further, it is also possible to constitute the disk drive to which the present invention is applied as follows. Note that the same members as those of the disk drive 31 mentioned above are given the same reference numerals, and details will be appropriately omitted.

Figure 19:
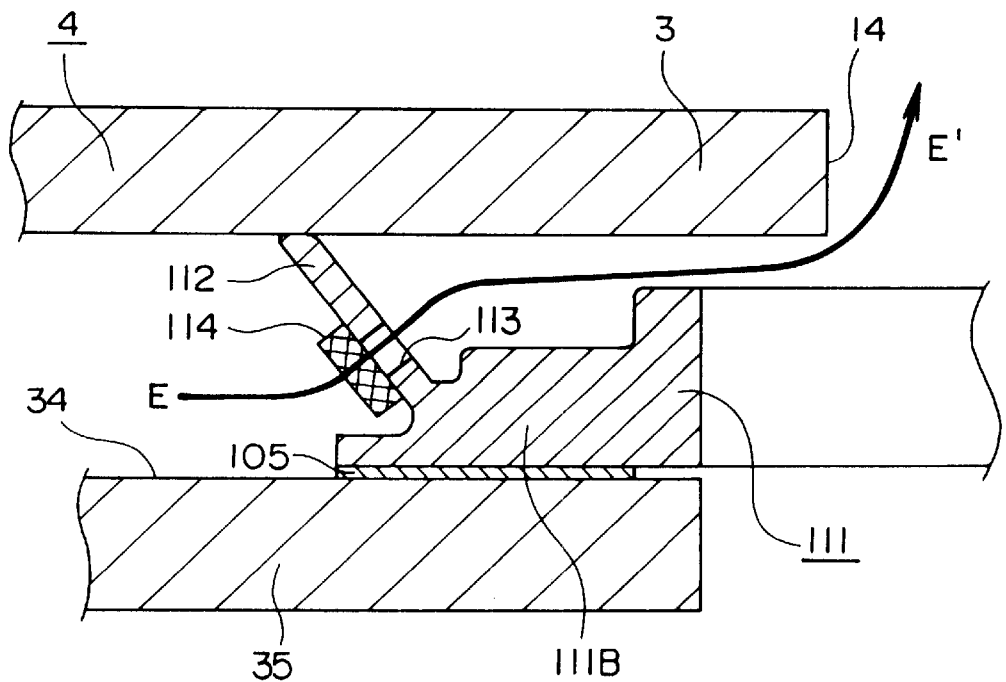
FIG. 19 is a sectional view of a sealing member having the lip to which a filter for eliminating the dust etc. contained in the air is attached.

FIG. 19 is a sectional view of an example in which a filter 114 is attached to a lip 112 of a sealing member 111.

In this disk drive, the filter 114 for filtering the air E to eliminate the dust etc. contained in the related air E is attached to the lip 112 of the sealing member The sealing member 111 used for this disk drive is arranged on the base 35 so as to surround the rotation mechanism 37 (or the disk table).

The sealing member 111 is formed to a ring shape by a resilient member such as an elastomer or rubber. The lip 112 is formed so as to flare outward from a base portion (base end portion) 111B toward the front end.

In the sealing member 111, when a disk cartridge 1 is loaded in the carrier 34, the lip 112 is brought into press-contact with the periphery (or the peripheral portion) of the disk drive opening 14 in the bottom surface of the cartridge body 4, uniformly resiliently displaces in the outward flaring direction, and is made to closely contact the bottom surface of the cartridge body 4.

Further, the part of the lip 112 in contact with the bottom surface of the cartridge body 4 is formed to substantially an arc shape so that the front end can smoothly move along the bottom surface of the cartridge body 4.

The lip 112 is formed with one or more air holes 113 serving as vent holes through which the air can pass. The filter 114 for eliminating the dust etc. contained in the air E is attached to the outside (outer circumferential side) of the lip 112 so as to cover the air holes 113.

This filter 114 is formed by a material having a large pressure loss and is formed so as not to pass air when the hard disk 5 is not rotating, but to pass the air E after filtering when the hard disk 5 rotates. The sealing member 111 to which the filter 114 is attached is attached to the height positioning projections 49, or the bottom surface of the base portion 111B of the sealing member 111 is attached to the base 35 by being bonded via the adhesive 105.

The disk drive provided with the sealing member 111 to which the filter 114 is attached as described above is subjected to the load comprising the weight of the disk cartridge 1 and the pressing force of the pressing members 62 attached to the top plate 61 of the cartridge holder 36 when the disk cartridge 1 is loaded in the carrier 34, whereby the lip 112 uniformly resiliently displaces in the outward flaring direction, is brought into press-contact with the bottom surface of the cartridge body 4, and is made to closely contact the bottom surface of the cartridge body 4.

By this, the drive opening 14 at the bottom surface of the cartridge body 4 is substantially sealed by the carrier 34, rotation mechanism 37, and the sealing member 111, and the entry of dust and other foreign matter from the drive opening 14 into the cartridge body 4 is prevented.

Then, when the rotation mechanism 37 is driven and the hard disk 5 rotates, an air flow is formed between the inner surface of the cartridge body 4 and the hard disk 5, and air pressure sucking the air E from the clearance between the disk drive opening 14 and the rotation mechanism 37 is generated.

That is, the air E on outside of the sealing member 111 is cleaned of dust etc. by the filter 114 to be made the clean air E' and flows into the cartridge body 4.

Accordingly, the flow of the air E containing the dust into the cartridge body 4 can be prevented, and the deposition of dust and other foreign matter on the hard disk 5 can be prevented.

Further, the collision of the dust etc. deposited on the hard disk 5 and the magnetic head element 52 can be eliminated. The magnetic head element 52 becomes stable in its floating state from the hard disk 5 and thus can reliably record or play back the information or signal.

Further, it is also possible to constitute the disk drive to which the present invention is applied as follows. Note that the same members as those of the disk drive 31 mentioned above are given the same reference numerals, and details will be appropriately omitted.

Figure 20:
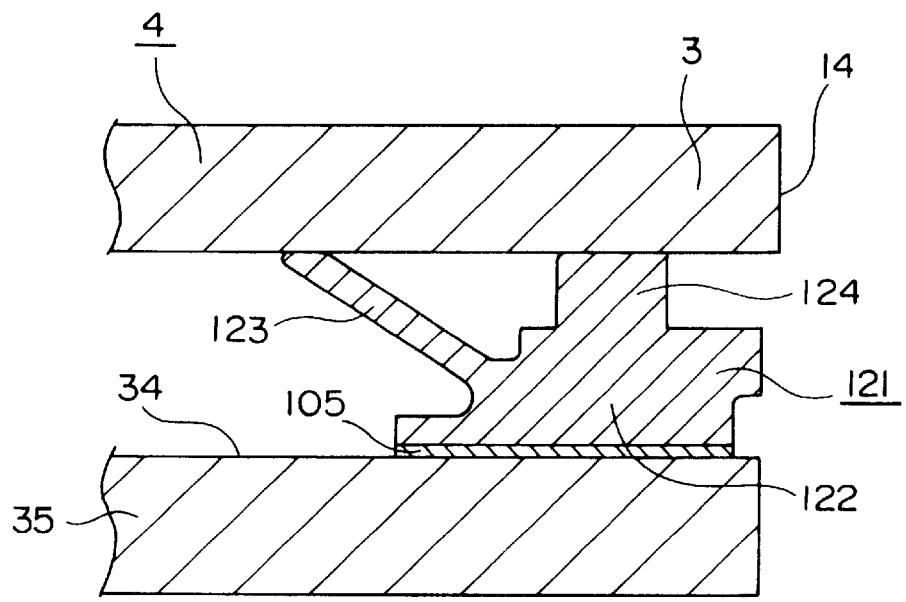
FIG. 20 is a sectional view of an example in which a height positioning projection is provided in a base portion and the height positioning projection is provided integrally with the sealing member.

FIG. 20 is a sectional view of an example in which the height positioning projections are provided integrally with the sealing member.

In this disk drive, as shown in FIG. 20, a height positioning projections 124 are provided integrally with a sealing member 121.

The sealing member 121 used for this disk drive is arranged on the base 35 so as to surround the rotation mechanism 37 (or the disk table).

The sealing member 121 is formed to a ring shape by a resilient member such as an elastomer or rubber. A lip 123 is formed so as to flare outward from a base portion (base end portion) 122 toward the front end.

When a disk cartridge 1 is loaded in the carrier 34, the lip 123 is brought into press-contact with the periphery of the disk drive opening 14 in the bottom surface of the cartridge body 4, uniformly resiliently displaces in the outward flaring direction, and is made to closely contact the bottom surface of the cartridge body 4.

Further, the part of the lip 123 in contact with the bottom surface of the cartridge body 4 is formed to substantially an arc shape so that the front end can smoothly moves along the bottom surface of the cartridge body 4.

The base end 122 of the sealing member 121 has integrally formed with it the height positioning projections 124 for positioning the loading position in the height direction when the disk cartridge 1 is loaded in the carrier 34.

When the disk cartridge 1 is loaded in the carrier 34, the bottom surface of the cartridge body 4 is pushed against the height positioning projections 124.

The height of the height positioning projections 124 is determined so as to be lower than the front end of the lip 123 in the state where the disk cartridge 1 is not loaded in the carrier 34.

By forming the height positioning projections 124 lower than the front end of the lip 123 in this way, when a disk cartridge 1 is loaded in the carrier 34, the lip 123 is brought into press-contact with the cartridge body 4 and resiliently displaced in the outward flaring direction.

This sealing member 121 is attached to the base 35 via an adhering means such as the adhesive 105 so as to surround the rotation mechanism 37 (or the disk table).

The disk drive provided with the sealing member 121 as described above is subjected to a load comprising the weight of the disk cartridge 1 and the pressing force of the pressing members 62 attached to the top plate 61 of the disk cartridge 1 when the disk cartridge 1 is loaded in the carrier 34, whereby the lip 123 uniformly resiliently displaces in the outward flaring direction, is brought into press-contact with the bottom surface of the cartridge body 4, and is made to closely contact the bottom surface of the cartridge body 4.

Simultaneously with this, the disk cartridge 1 is positioned in the height direction by the height positioning projections 124 integrally formed with the base end 122 of the sealing member 121 pushing against the bottom surface of the cartridge body 4.

Due to this, the disk cartridge 1 is positioned in the height direction by the sealing member 121, the drive opening 14 is sealed by the carrier 34, rotation mechanism 37, and the sealing member 121, and the entry of dust and other foreign matter from the drive opening 14 is prevented.

When the drive portion 44 of the rotation mechanism 37 is driven and the hard disk 5 rotates, an air flow is formed between the inner surface of the cartridge body 4 and the hard disk 5, and air pressure sucking the air from the clearance between the drive opening 14 and the rotation mechanism 37 is generated.

On the periphery of the drive opening 14, however, the lip 123 of the sealing member 121 is brought into press-contact with the bottom surface of the cartridge body 4, therefore this air flow is shut off by the sealing member 121, and the sucking of the air outside of the sealing member 121 from the drive opening 14 is prevented.

Accordingly, in the cartridge body 4, the entry of the air containing dust in the drive body into the cartridge body 4 can be prevented, and deposition of dust and other foreign matter to the hard disk 5 on the cartridge body 4 can be prevented.

Further, the collision of the dust etc. deposited on the hard disk 5 and the magnetic head element 52 can be eliminated. The magnetic head element 52 becomes stable in its floating state from the hard disk 5 and thus can reliably record or play back the information or signal.

While the above explanation was made of disk drives to which the present invention is applied by referring to the drawings, the present invention is not limited to this.

For example, the disk cartridge used in the present invention may be an optical disk or a magneto-optic disk other than a hard disk.

When an optical disk is used as the recording medium, an optical pickup may be arranged on for example the base at a position facing the optical disk as the recording and playing back means. Further, when a magneto-optic disk is used for the recording medium, an optical pickup and magnetic head may be arranged to face to each other as the recording and playing back means.

Figure 21:
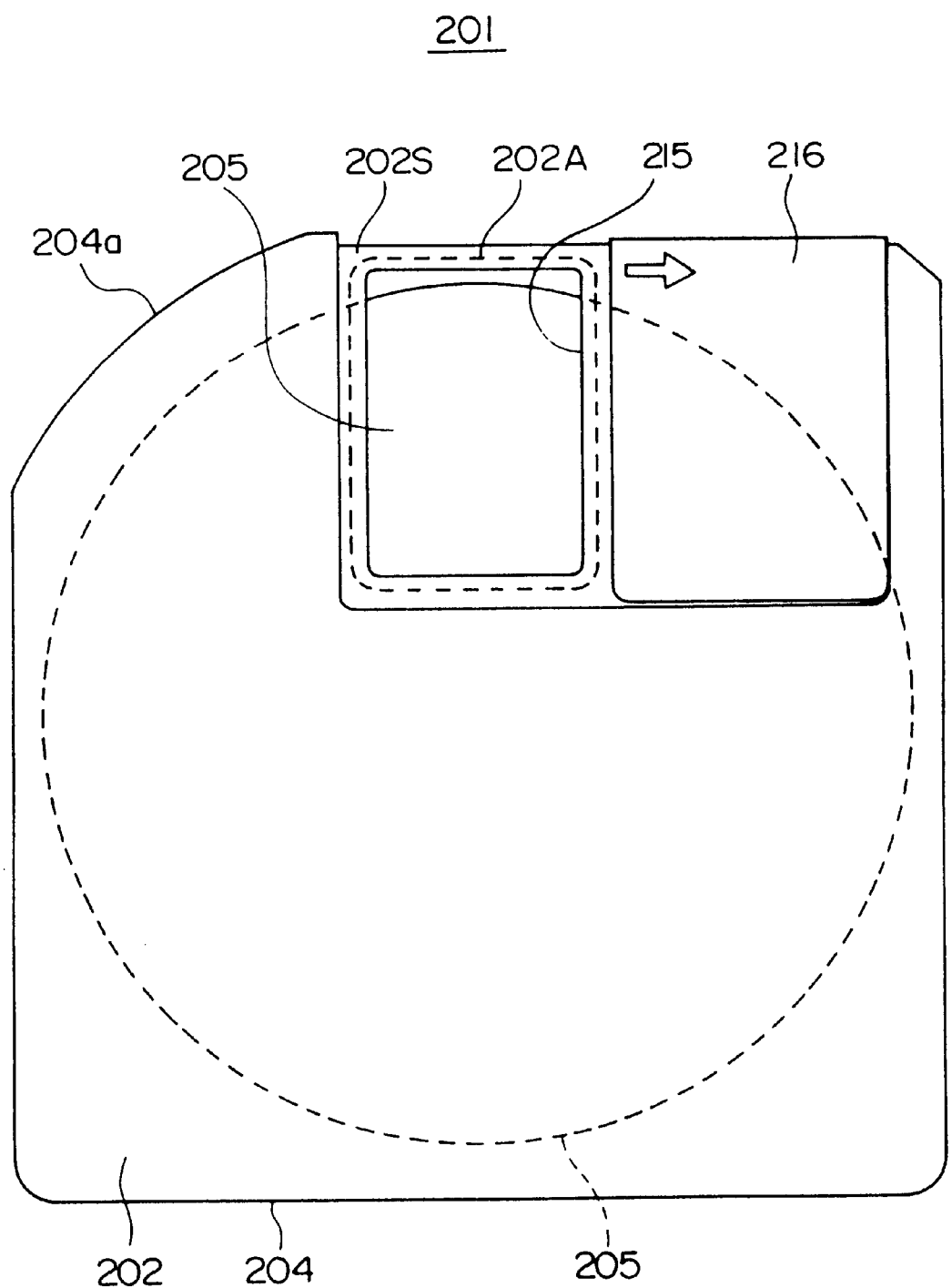
FIG. 21 is a top view of a disk cartridge in the state where the shutter of the disk cartridge is open.
Figure 22:
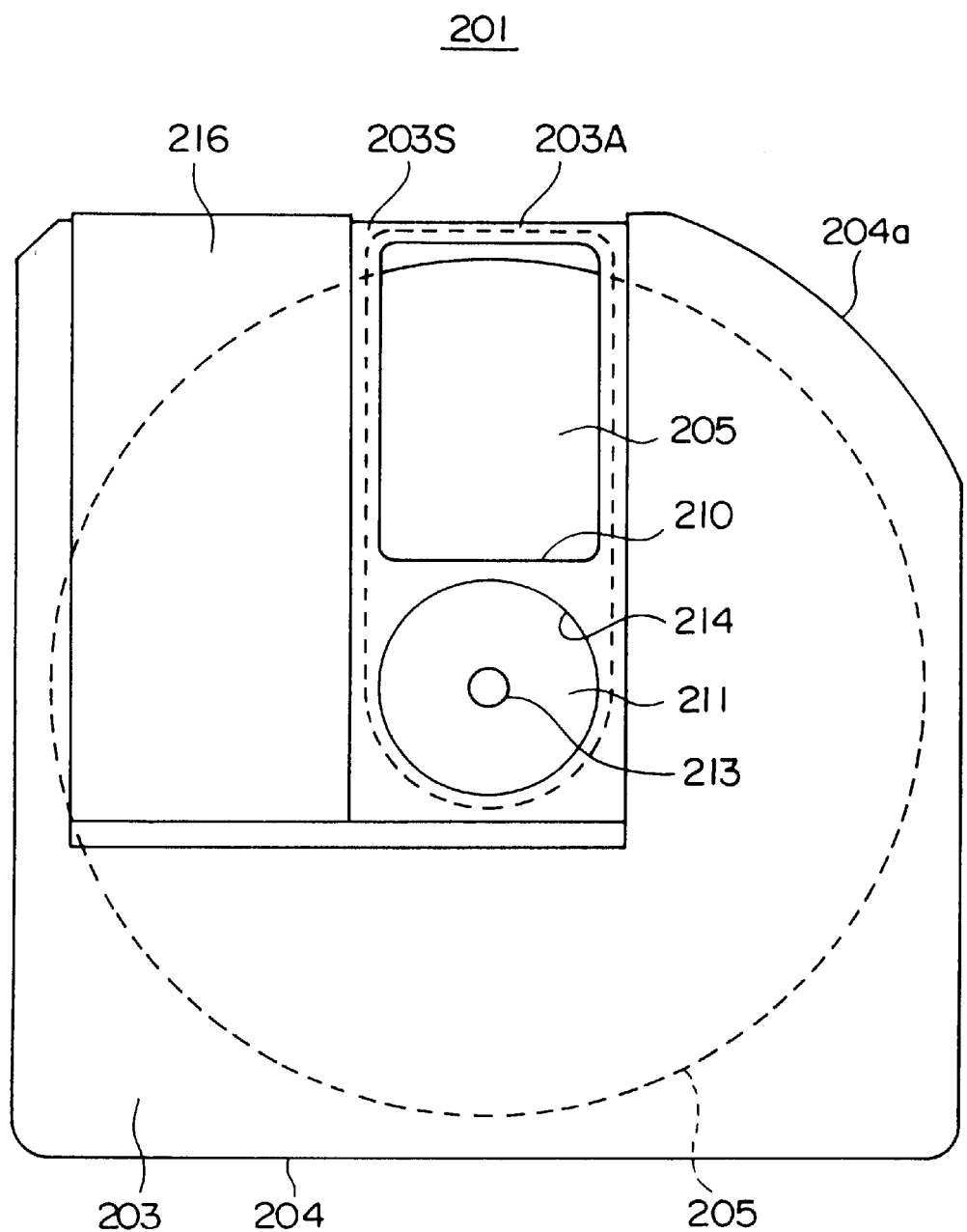
FIG. 22 is a bottom view of a disk cartridge in the state where the shutter of the disk cartridge is open.

FIG. 21 and FIG. 22 are explanatory views of an example of a disk cartridge rotatably accommodating a magneto-optic disk. FIG. 21 is a top view in the state where the shutter of the disk cartridge is opened, and FIG. 22 is a bottom view in the state where the shutter of the disk cartridge is opened.

This disk cartridge 201 has a magneto-optic disk 205, a cartridge body 204, and a shutter 216. The cartridge body 204 is constituted b an upper half (upper shell) 202 and a lower half (lower shell) 203 mated and connected to each other.

On the surface of the upper half 202, a flat part (flat portion) 202S is formed at a slightly sunken position. An opening 215 for accessing the magnetic head is formed in this flat portion 202S. The shutter 216 moves along the flat portion 202S of the upper half 202.

In the disk cartridge 201, among the ends able to be inserted into the disk drive, the end 204a in the direction for closing the shutter 216 is formed to substantially an arc shape. Therefore, the user can easily recognize the insertion direction into the disk drive.

In the surface of the lower half 203, a flat portion 203S is formed at a slightly sunken position. A disk drive opening 214 and an opening 210 for accessing the optical pickup are formed in this flat portion 203S. The shutter 216 moves along the flat portion 203S of the lower half 203.

When the disk cartridge 201 is not loaded in the disk drive, the shutter 216 of the disk cartridge 201 is in the closed state, and the openings 210, 214, and 215 are hidden behind the shutter 216.

When the disk cartridge 201 is loaded in the disk drive, the shutter 216 of the disk cartridge 201 becomes open.

When the shutter 216 becomes open, in the upper half 202, the opening 215 for accessing to the magnetic head appears, and the top surface of the magneto-optic disk 205 is exposed from the opening 215.

Further, in the lower half 203, the disk drive opening 214 and the opening 210 for accessing the optical pickup appear, a lower hub 211 and an insertion hole 213 are exposed from the disk drive opening 214, and the bottom surface of the magneto-optic disk 205 is exposed from the opening 210.

Then, in the flat portion 202S of the upper half 202, the lip of the first sealing member of the disk drive closely contacts a dotted line region 202A in the peripheral portion of the opening 215 to thereby prevent the entry of dust from the opening 215 into the disk cartridge 201.

Further, in the flat portion 203S of the lower half 203, the lip of the second sealing member of the disk drive closely contacts a dotted line region 203A in the peripheral portion of the openings 210 and 214 surrounding the openings 210 and 214 to thereby prevent the entry of dust from the openings 210 and 214 into the disk cartridge 201.

By bringing the lips of the sealing members into press-contact with the level flat portions 202S and 203S, the sealing property can be improved.

Figure 23:
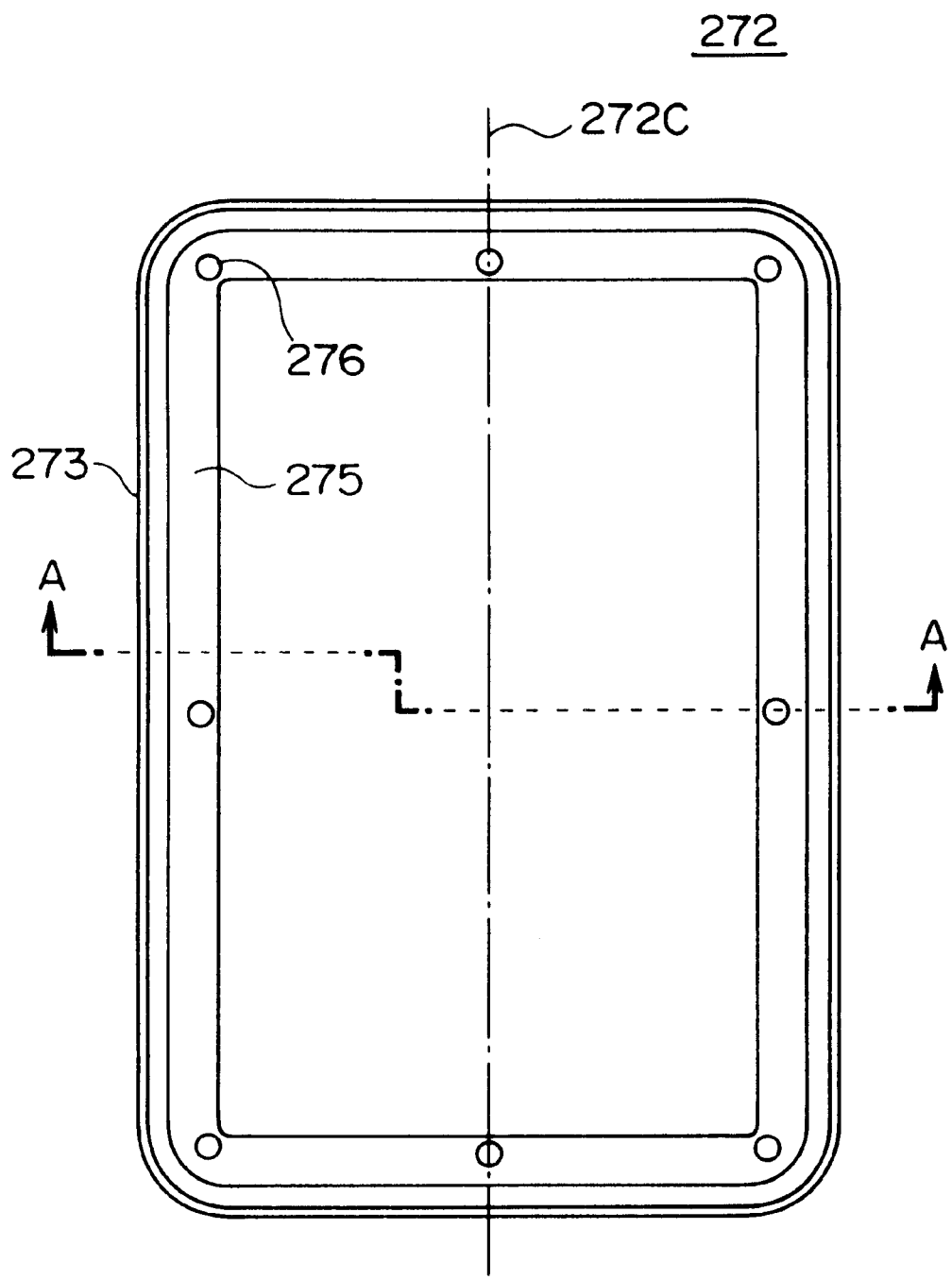
FIG. 23 is a plan view of a first sealing member.
Figure 24A:
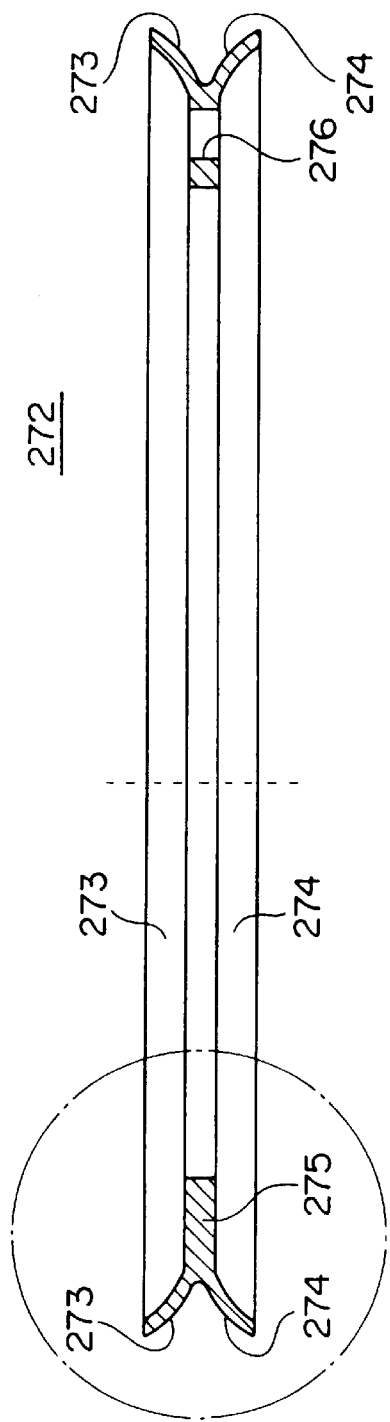
FIGS. 24A and 24B are sectional views taken along an arrow of the first sealing member of FIG. 23.
Figure 24B:
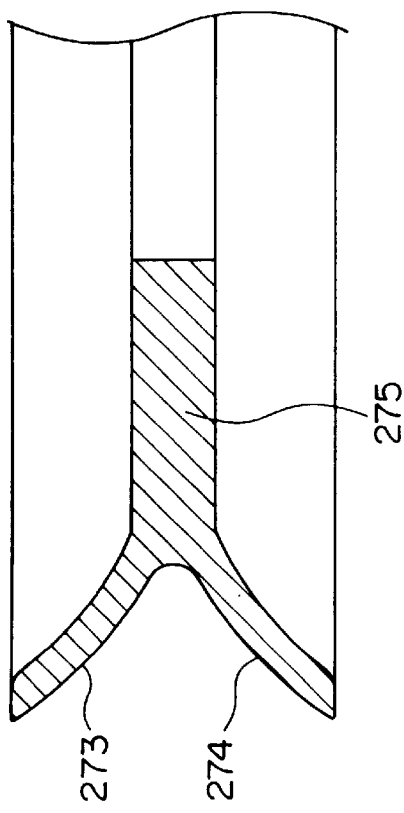

FIG. 23 and FIGS. 24A and 24B are views of an example of the first sealing member. FIG. 23 is a plan view of the first sealing member. FIGS. 24A and 24B are sectional views of the first sealing member of FIG. 23, wherein FIG. 24A is a sectional view when the first sealing member 272 of FIG. 23 is cut along the dotted line and seen in the direction indicated by the arrow A, and FIG. 24B is an enlarged view of the part in the circle in FIG. 24A.

The first sealing member 272 has an annular base portion 275 formed by a resilient member such as an elastomer or rubber and lips 273 and 274 projecting from the base portion 275 and flaring outward. The base portion 275 is formed with a plurality of attachment holes 276 as through holes in the circumferential direction.

The base portion 275 forms a band shape having the same width or substantially the same width along the periphery of a predetermined shape. The predetermined shape is substantially the same as a rectangle with the four corners of the rectangle a little rounded.

The first lip 273 projects from the top side of the base portion 275, while the second lip 274 projects from the bottom side of the base portion 275. The first and second lips 273 and 274 are formed substantially symmetrically about the base portion 275.

The first sealing member 272 is formed horizontally symmetrically about a line 272C, so the top view and the bottom view become the same. By making the front and back symmetric (making the shapes of the front and back the same) in this way, at the time of attachment for attaching the first sealing member 272 to the disk drive, the sealing member 272 can be attached at its top surface or at its bottom surface, thereby enabling the reduction of trouble in the attachment.

Figure 25:
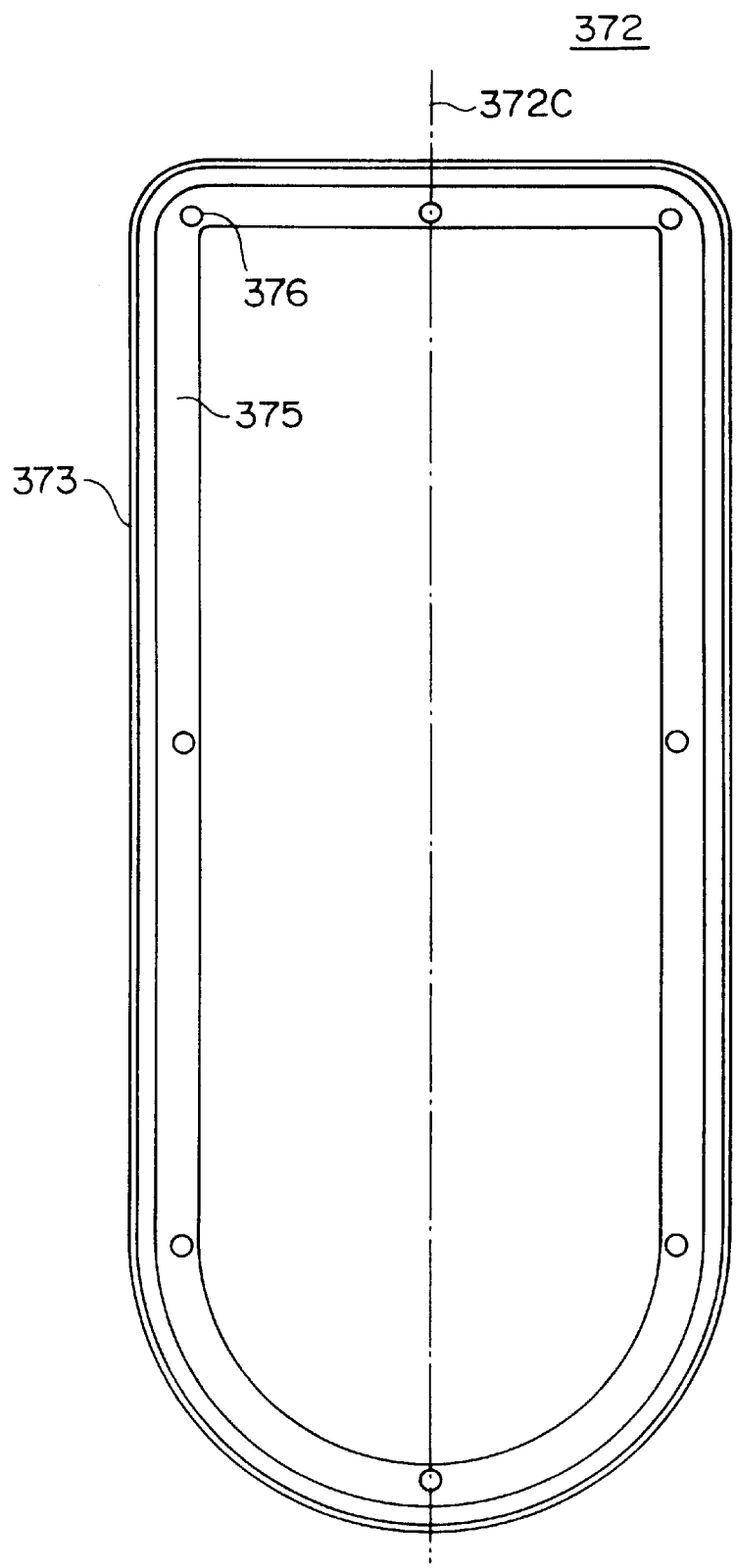
FIG. 25 is a plan view of a second sealing member.

FIG. 25 to FIG. 27 are views of an example of a second sealing member.

FIG. 25 is a plan view of the second sealing member. FIG. 26 is a perspective view of the second sealing member of FIG. 25. FIGS. 27A and 27B are sectional views of the second sealing member of FIG. 25, wherein FIG. 27A is a sectional view where a second sealing member 372 of FIG. 26 is cut along the dotted line and seen in the direction indicated by the arrow A, and FIG. 27B is an enlarged view of the part in the circle of FIG. 27A.

The second sealing member 372 is formed by a resilient member such as an elastomer or rubber and has an annular base portion 375 and lips 373 and 374 projecting from the base portion 375 and flaring outwardly. The base portion 375 is formed with a plurality of attachment holes 376 as through holes in the circumferential direction.

The base portion 375 forms a band shape having the same width or substantially the same width along the periphery of a predetermined shape. The predetermined shape is the same or substantially the same as a shape of a rectangle with one short side removed and an arc of a semi-circle having a diameter equal to the length of the related short side connected to the ends of the two long sides.

The remaining two corners of the rectangle are rounded a little.

The first lip 373 projects from the top side of the base portion 375, and the second lip 374 projects from the bottom side of the base portion 375. The first and second lips 373 and 374 are formed substantially symmetrically about the base portion 375.

The second sealing member 372 is formed horizontally symmetrically about a line 372C, so the top view and the bottom view become the same. By making the front and back symmetric (making the shapes of the front and back the same) in this way, at the time of attachment for attaching the sealing member 372 to the disk drive, the sealing member 372 can be attached at its top surface or can be attached at its bottom surface, thereby enabling reduction of the trouble in attachment.

Further, it is also possible to constitute the disk drive to which the present invention is applied as follows. Note that the same members as those of the disk drive 31 mentioned above are given the same reference numerals, and details will be appropriately omitted.

Figure 28:
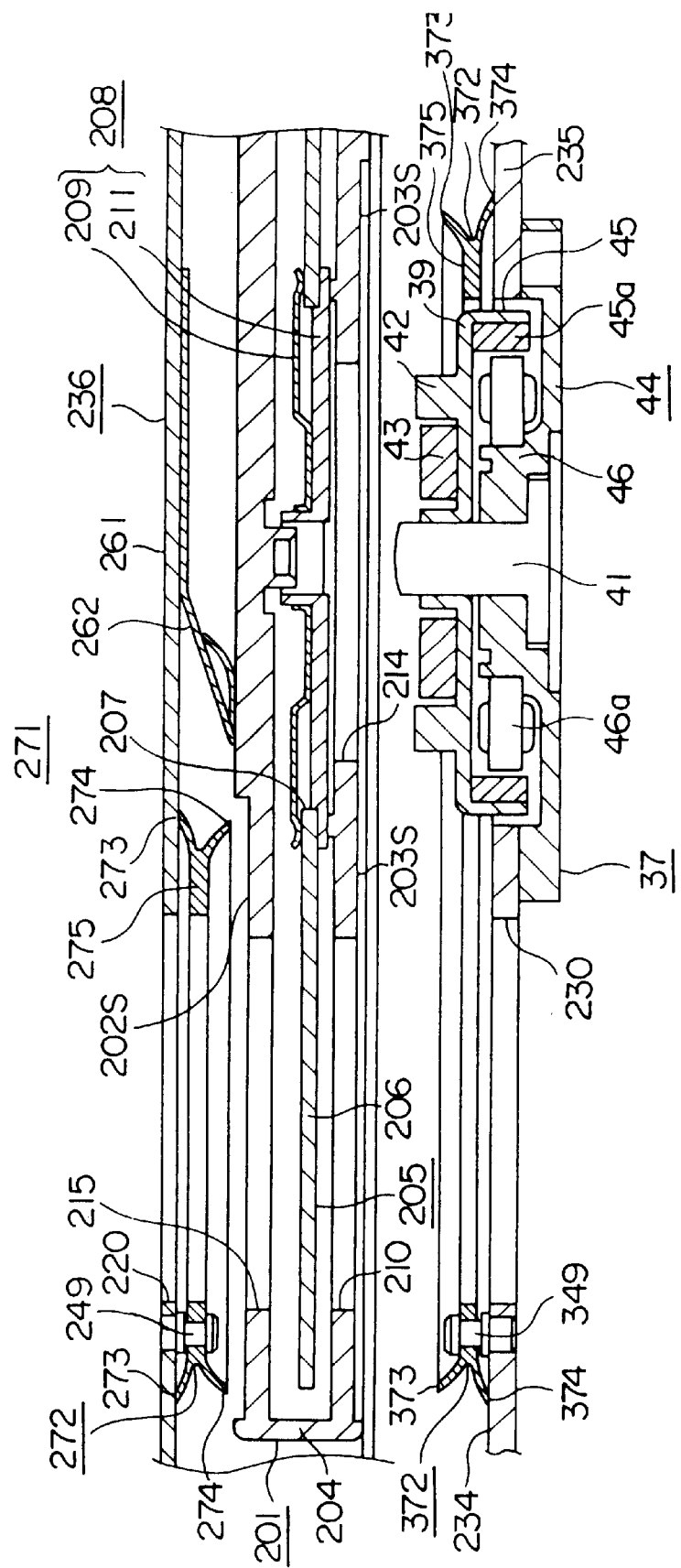
FIG. 28 is a sectional view of a disk drive for a magneto-optic disk.

FIG. 28 is a sectional view of a modification of the disk drive 31. As shown in FIG. 28, in this disk drive 271, the first sealing member 272 is attached to a top plate 261, and the second sealing member 372 is attached to a base 235.

As shown in FIG. 21 to FIG. 28, the first sealing member 272 is formed to a ring shape by a resilient member and arranged so as to surround the periphery (or peripheral portion) of an opening 220 for accessing the magnetic head formed in the top plate 261 of a cartridge holder 236.

In the first sealing member 272, the first lip 273 is formed on the upper side from the center portion of the thickness direction, and the second lip 274 is formed on the lower side.

The first lip 273 is brought into press-contact with the top plate 261 and formed so as to flare outward from the center portion toward the front end in the thickness direction.

The second lip 274 is brought into press-contact with the peripheral region 202A of the opening 215 of the flat portion 202s formed in the top surface of the cartridge body 204 and formed so as to flare outward from the center portion toward the front end in the thickness direction.

The second sealing member 372 is formed to a ring shape by a resilient member and arranged so as to surround the rotation mechanism 37 (or the disk table 39).

In the second sealing member 372, the first lip 373 is formed on the upper side from the center portion in the thickness direction, and the second lip 374 is formed on the lower side.

The first lip 373 is brought into press-contact with the peripheral region 203A of the openings 210 and 214 of the flat portion 203S formed in the bottom surface of the cartridge body 204 and formed so as to flare outward from the center portion toward the front end in the thickness direction.

The second lip 374 is brought into press-contact with the base 235 and formed so as to flare outward from the center portion toward the front end in the thickness direction.

When a disk cartridge 201 is loaded in a carrier 234, the load comprised of the weight of the disk cartridge 201 and the pressing force of pressing members 262 attached to the top plate 261 of a cartridge holder 236 is applied to the first and second lips 373 and 374 of the second sealing member 372, whereby they uniformly resiliently displace in the outward flaring direction and are brought into press-contact with the bottom surface of the cartridge body 204 and the base 235.

Further, the parts of the first and second lips 373 and 374 in contact with the bottom surface of the cartridge body 204 and the base 235 are formed to substantially an arc shape so that the front ends can smoothly move along the bottom surface of the cartridge body 204 and the base 235.

In the second sealing member 372, the first lip 373 is pushed against the bottom surface of the cartridge body 204, and the second lip 374 is pushed against the base 335, therefore the sealing member 372 can be attached to the base 335 without bonding, it is possible to reduce the trouble of the attachment, and there are cost advantages.

When a disk cartridge 201 is loaded in the carrier 234, the first and second lips 273 and 274 of the first sealing member 272 resiliently displace in the outward flaring direction and are brought into press-contact with the top surface of the cartridge body 204 and the top plate 261.

Further, the parts of the first and second lips 273 and 274 in contact with the top surface of the cartridge body 204 and the top plate 261 are formed to substantially an arc shape so that the front ends can smoothly move along the top surface of the cartridge body 204 and the top plate 261.

In the first sealing member 272, the first lip 273 is pushed against the top plate 261, and the second lip 274 is pushed against the top surface of the cartridge body 204, therefore the sealing member 272 can be attached to the top plate 261 without bonding, it is possible to reduce the trouble of the attachment, and there are cost advantages.

This first sealing member 272 is attached to the top plate 261 by the projection 249 provided at the top plate 261.

The first sealing member 272 is formed with an attachment piece 275 inwardly from the center portion in the thickness direction. This attachment piece 275 constitutes the base portion. This attachment piece 275 is formed with a plurality of attachment holes 276 in the circumferential direction.

The attachment holes 276, as shown in FIG. 28, have projections 249 inserted into them. The first sealing member 272 is attached so that it can slightly move in the height direction of the projections 249.

The second sealing member 372 is attached to the base 235 by height positioning projections 349 for positioning the loading position in the height direction of the disk cartridge 201 to be loaded in the carrier 234.

The second sealing member 372 is formed with an attachment piece 375 inwardly from the center portion in the thickness direction. This attachment piece 375 constitutes the base portion. This attachment piece 375 is formed with a plurality of attachment holes 376 in the circumferential direction.

The attachment holes 376, as shown in FIG. 28, have inserted into them the height positioning projections 349 for positioning of the loading position of the disk cartridge 201 in the height direction. The second sealing member 372 is attached so that it can slightly move in the height direction of the height positioning projections 349.

When the disk drive 271 constituted as described above is inserted from the opening formed in the front surface of the drive body as shown in FIG. 1, it operates as follows.

When the disk cartridge 201 is inserted into the drive body, the disk cartridge 201 is held at its two edges by a not illustrated holding portion of the cartridge holder 236.

Next, the cartridge holder 236 moves downward to the direction of the base 235, thereby to load the disk cartridge 201 in the carrier 234. At this time, the shutter member 216 of the disk cartridge 201 becomes open and opens the openings 210, 214, and 215.

Figure 29:
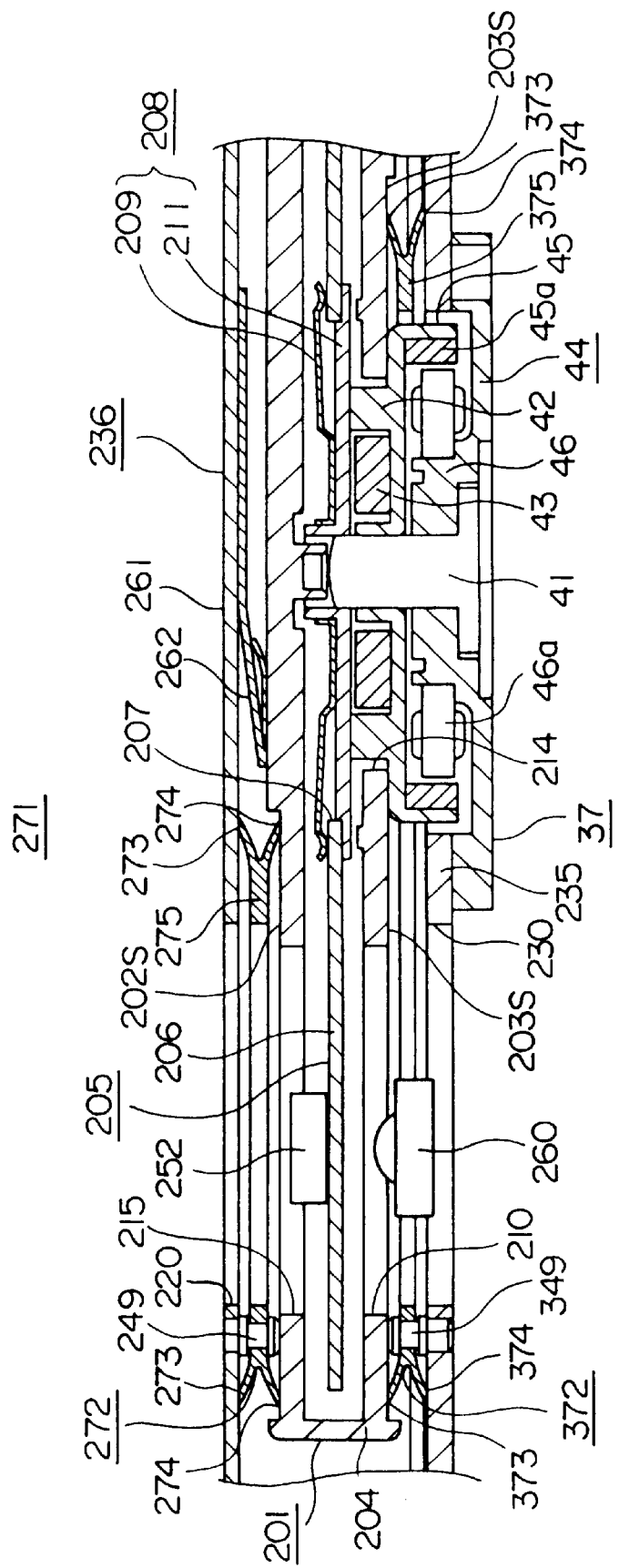
FIG. 29 is a sectional view of a disk drive in the state where a disk cartridge accommodating a magneto-optic disk is loaded in the carrier.

Then, as shown in FIG. 29, the rotation mechanism 37 on the disk drive 271 side enters from the disk drive opening 214 and magnetically attracts the hub mechanism 208 by the magnet 43 attached to the disk table 39 of the rotation mechanism 37, whereby the disk table 39 of the rotation mechanism 37 clamps the magneto-optic disk 205.

Further, the magnetic head element 252 of the disk drive 271 side enters from the opening 220 of the top plate 261 and the opening 215 of the disk cartridge 201. The magnetic head element 252 moves to the position close to the top surface of the magneto-optic disk 205.

Further, an optical pickup 260 (or the object lens of the optical pickup 260 and the lens holder) on the disk drive 271 side enters from an opening 230 of the base 235 and the opening 210 of the disk cartridge 201. The optical pickup 260 moves to a position where the laser beam can be focused to the magneto-optic disk 205 close to the bottom surface of the magneto-optic disk 205.

FIG. 29 is a sectional view of the disk drive in the state where the disk cartridge is loaded in the carrier.

As shown in FIG. 29, the pressing members 262 press the disk cartridge 201 held at the cartridge holder 236 against the carrier 234 to thereby restrict the loading position of the disk cartridge 201 and presses the bottom surface of the disk cartridge 201 against the first lip 373 of the second sealing member 372.

The second sealing member 372 is pressed against the disk cartridge 201, thereby to slightly move downward along the height positioning projections 349, and the second lip 374 is brought into press-contact with the base 235.

Further, the second lip 274 is pressed against the disk cartridge 201, whereby the first sealing member 272 slightly moves upward along the height positioning projections 249, and the first lip 273 is brought into press-contact with the top plate 261.

The second sealing member 372 becomes sandwiched between the flat portion 203S of the disk cartridge 201 and the base 235. The first lip 373 is pressed against the bottom surface of the cartridge body 204, thereby to resiliently displace in the outward flaring direction and made to closely contact the bottom surface of the cartridge body 204. The second lip 374 resiliently displaces in the outward flaring direction and is made to closely contact the base 235.

By this, the periphery of the openings 210 and 214 formed in the bottom surface of the cartridge body 204 are sealed by the carrier 234 (or the base 235), the rotation mechanism 37, and the second sealing member 372, thus the entry of dust and other foreign matter from the gap between the cartridge body 204 and the carrier 234 into the cartridge body 204 through the openings 210 and 214 can be prevented.

Further, the first sealing member 272 is sandwiched between the flat portion 202S of the disk cartridge 201 and the top plate 261. The second lip 274 is pressed against the top surface of the cartridge body 204, thereby to resiliently displace in the outward flaring direction and be made to closely contact the top surface of the cartridge body 204. The first lip 273 resiliently displaces in the outward flaring direction and is made to closely contact the top plate 261.

By this, the periphery of the opening 215 formed in the top surface of the cartridge body 204 is sealed by the top plate 261 and the first sealing member 272, and thus it is possible to prevent the entry of dust and other foreign matter from the space between the cartridge body 204 and the top plate 261 into the cartridge body 204 through the opening 215.

Accordingly, in the cartridge body 204, the entry of air containing dust in the cartridge holder 236 into the cartridge body 204 can be prevented, and it is possible to prevent the deposition of dust and other foreign matter on the magneto-optic disk 205 in the cartridge body 204.

Further, the collision of the dust etc. deposited on the magneto-optic disk 205 and the magnetic head element 252 can be eliminated. The magnetic head element 252 becomes stable in its floating state from the magneto-optic disk 205 and thus can reliably record or play back the information or signal.

Figure 30A:
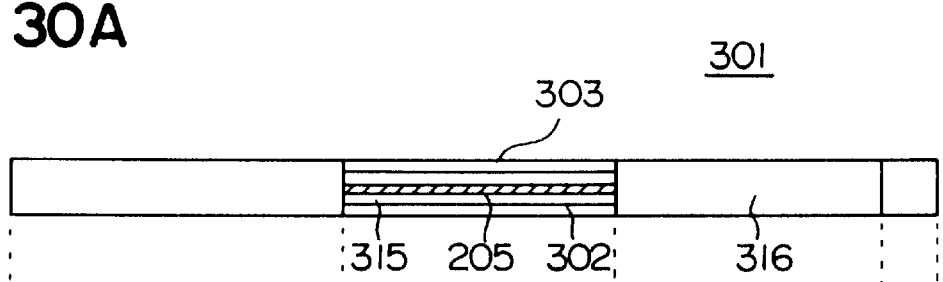
Figure 30B:
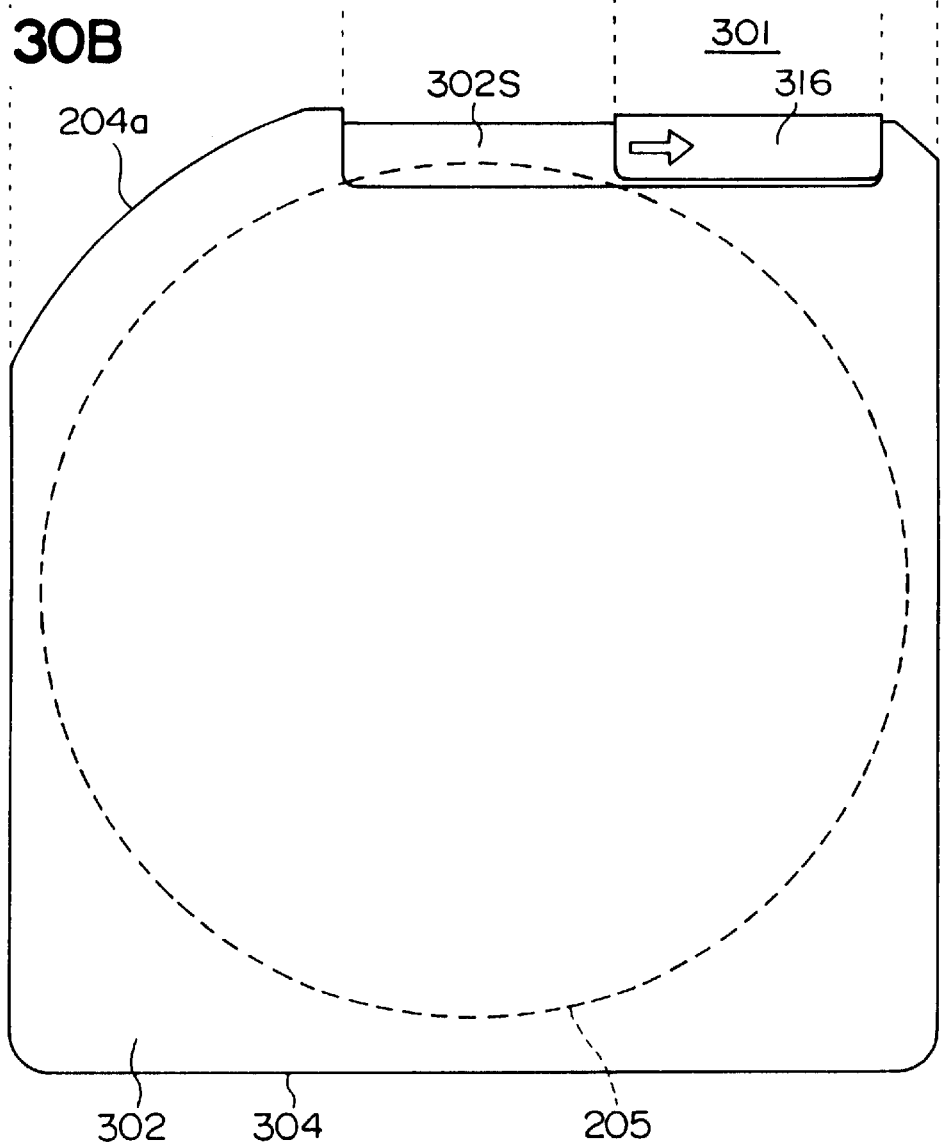
Figure 31:
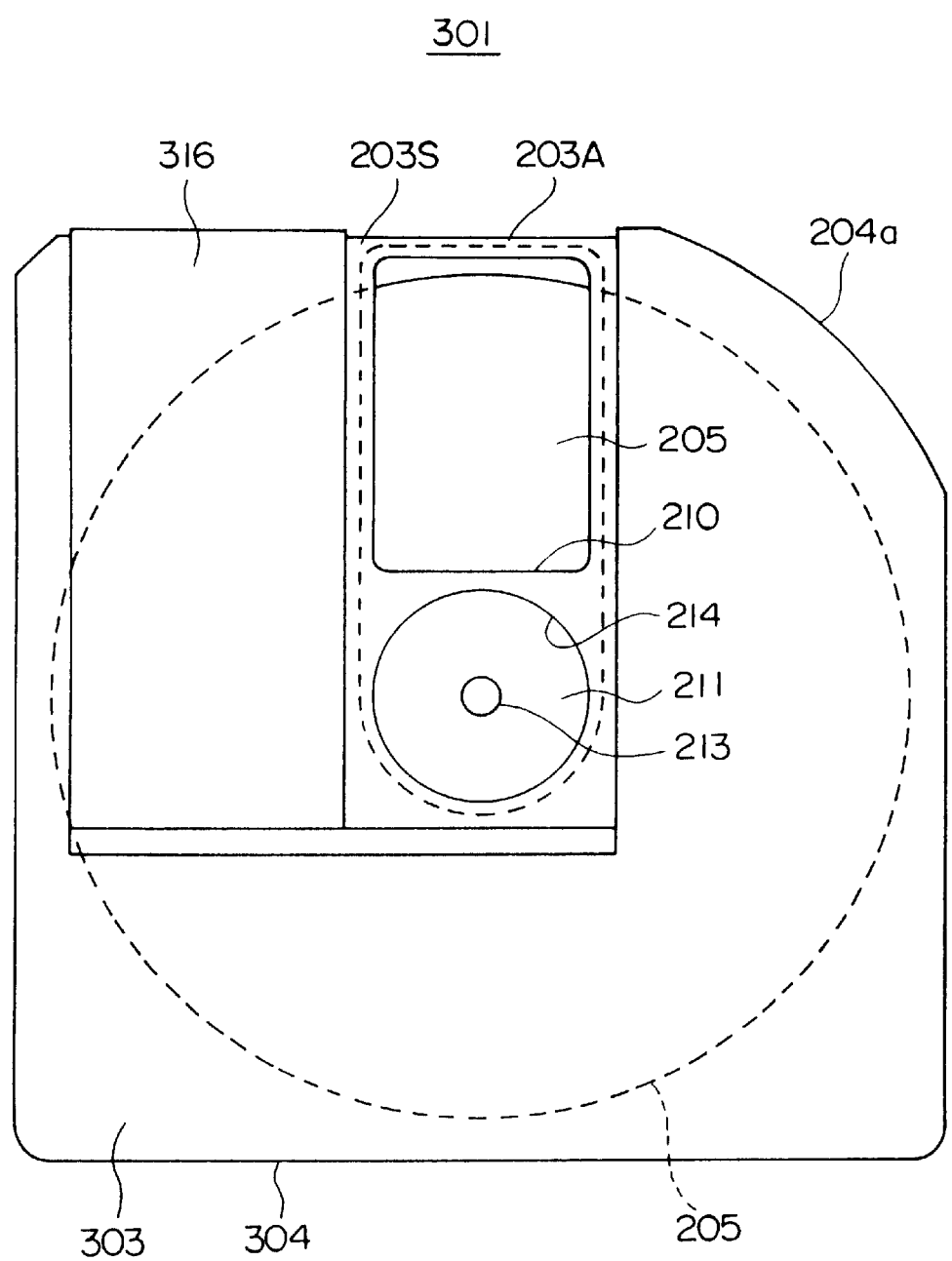
FIG. 31 is a bottom view of the disk cartridge in the state where the shutter of the disk cartridge is open.

FIGS. 30A and 30B and FIG. 31 are explanatory views of another example of a disk cartridge rotatably accommodating a magneto-optic disk.

FIG. 30A is a side view on the shutter side in the state where the shutter of the disk cartridge is open, and FIG. 30B is a top view in the state where the shutter of the disk cartridge is open. FIG. 31 is a bottom view in the state where the shutter of the disk cartridge is open.

Note that, in FIGS. 30A and 30B and FIG. 31, constituent parts the same or substantially the same as those of the disk cartridge 201 of FIG. 21 and FIG. 22 are given the same reference numerals, and the explanation of the related constituent parts the same or substantially the same will be appropriately omitted.

This disk cartridge 301 has a magneto-optic disk 205, a cartridge body 304, and a shutter 316. The cartridge body 304 is constituted by an upper half (upper shell) 302 and a lower half (lower shell) 303 mated and connected with each other.

An opening 315 for accessing the magnetic head is opened in the side surface on the shutter side of the cartridge body 301.

In the surface of the upper half 302, a flat portion 302S is formed at a slightly sunken position. The shutter 316 moves along the flat portion 302S of the upper half 302.

In the disk cartridge 301, among the ends able to be inserted into the disk drive, the end 204a in the direction for closing the shutter 316 is formed to substantially an arc shape. Therefore, the user can easily recognize the insertion direction into the disk drive.

In the surface of the lower half 303, a flat portion 203S is formed at a slightly sunken position. A disk drive opening 214 and an opening 210 for accessing the optical pickup are formed in this flat portion 203S. The shutter 316 moves along the flat portion 203S of the lower half 303.

When a disk cartridge 301 is not loaded in the disk drive, the shutter 316 of the disk cartridge 301 is in the closed state, and the openings 210, 214 and 315 are hidden behind the shutter 316. when a disk cartridge 301 is loaded in the disk drive, the shutter 316 of the disk cartridge 301 becomes open.

When the shutter 316 becomes open, the opening 315 for accessing the magnetic head is opened in the side surface of the disk cartridge 301.

Further, in the lower half 303, the disk drive opening 214 and the opening 210 for accessing the optical pickup appear, a lower hub 211 and an insertion hole 213 are exposed from the disk drive opening 214, and the bottom surface of the magneto-optic disk 205 is exposed from the opening 210.

Then, in the flat portion 203S of the lower half 303, the lip of the sealing member of the disk drive closely contacts the dotted region 203A in the peripheral portion of the openings 210 and 214 surrounding the openings 210 and 214 to thereby prevent the entry of dust from the openings 210 and 214 into the disk cartridge 301.

The magneto-optic disk accommodated in the disk cartridge is provided with an annular recess at the center portion of the top surface of the disk body. A disk-shaped clamping plate made of a magnetic material is fit into this recess. The flat portion of a projecting portion of the clamping plate has the shape appearing at the bottom surface of the disk body. It is also possible to use the flat portion appearing at the bottom surface of the disk as the clamp portion, and it is also possible to use the flat portion and the peripheral portion thereof as the clamp portion. In this case, the flat portion of the clamping plate is attracted and clamped to the rotation table side by the magnet attached to the rotation table and thereby makes the magneto-optic disk rotate.

Further, in FIG. 31, the opening 214 and the opening 210 for driving the disk are separately provided in the lower half 303, but these openings 210 and 214 may also be connected to form a single opening.

Similarly, in FIG. 22, the opening 214 and the opening 210 for driving the disk are separately provided in the lower half 203, but these openings 210 and 214 may be connected to form a single opening.

Further, in FIG. 24, the example was given of a sealing member 272 in which the lips 273 and 274 are formed symmetrical about the base portion 275, but the invention is not limited to this. It is also possible to use a sealing member in which the first and second lips project from the bottom side of the base portion 275, it is also possible to attach the sealing member by bonding, and it is also possible to provide through holes in the base portion and attach the sealing member by using the through holes. Further, it is also possible to use a sealing member in which the first and second lips project from the top side of the base portion 275 and the third and fourth lips project from the bottom side.

Similarly, in FIG. 27, the example was given of a sealing member 372 in which the lips 373 and 374 are formed symmetrical about the base portion 375, but the invention is not limited to this. It is also possible to use a sealing member in which the first and second lips project from the top side of the base portion 375, it is also possible to attach the related member by bonding, and it is also possible to provide through holes in the base portion and attach the sealing member by using the through holes. Further, it is also possible to use a sealing member in which the first and second lips project from the top side of the base portion 375 and the third and fourth lips project from the bottom side.

As the material of the sealing member used for the disk drive according to the present invention, preferably a silicone rubber (VMQ) is used.

A silicone rubber has the advantage that the range of the heat resistant temperature can be made about −50° C. to +250° C., so the rubber can be made soft. When representing this by the rubber hardness, it is possible to make this soft to about Hs=30 degrees.

A gas is sometimes slightly generated from a silicone rubber, but in a disk drive using a removable disk such as a removable hard disk, the gas can escape from the space between the disk cartridge and the rotation mechanism. As the related disk drive, for example an N-CSS (Non-Contact Start Stop) system or L/UL (Load/Unload) system is used.

Further, a silicone rubber has a small compression set, therefore is effective when pressure is repeatedly applied.

Once a gasket and an O-ring are crushed for sealing, they are used as if they were semi-permanently held in the crushed state.

On the other hand, in the sealing member used in the disk drive of the present invention, even if the disk cartridge is repeatedly inserted and ejected, the repeat performance is stable and it is possible to obtain proper characteristics.

Further, a silicone rubber can be shaped thin, and it is possible to reduce the pressing force for pushing of the sealing member. For example, it is possible to give a thickness of about 0.1 mm to a silicone rubber.

The sealing by the sealing member is carried out by pressing the upper half by the pressing members when the disk cartridge is loaded, making the lip of the sealing member closely contact the surface of the bottom half, and making the inclined surface of the lip of the sealing member bend by the pressing force of the pressing members and the weight of the disk cartridge.

Where the counterforce of the lip of the sealing member is small, a predetermined sealing performance can be obtained with a small pressing force, a sliding resistance (friction resistance) at the insertion and ejection of the disk cartridge can be made small by making the pressing force of the pressing members small, and thus it becomes possible to smoothly insert and eject the disk cartridge.

Where the pressing force of the pressing members is small, there is an advantage that deformation of the disk cartridge by the bending due to the counterforce of the sealing member can be prevented.

Further, even in a case where a flatness of the surface of the disk cartridge is not good, the lip of the sealing member appropriately contacts the surface of the disk cartridge to enable sealing to be secured.

Note that it is also possible to coat the silicone rubber so that it does not generate gas or heat treat it to completely discharge the gas, and then use it in the disk drive.

As the material of the sealing member, a fluorine-contained rubber (FKM) can also be used.

A fluorine-contained rubber generates extremely little gas and is excellent in chemical resistance, heat resistance, weather resistance, ozone resistance, and electric insulation.

As the material of the sealing member, an ethylene propylene rubber (EPDM) can also be used.

An ethylene propylene rubber is obtained by copolymerizing an ethylene propylene diolefin (EPD), a saturated rubber comprised of a copolymer of ethylene and propylene not having a double bond in the molecules, with a third component (unconjugated diolefin). It generates little gas and is excellent in weather resistance, chemical resistance, electric insulation, etc.

As the material of the sealing member, a polyurethane can also be used. A polyurethane-based thermal reversible elastomer such as a thermal polyphenol urethane (TPU) can also be used.

A polyurethane generates little gas and is excellent in the weather resistance, chemical resistance, electric insulation, and so on and can be controlled in the rubber hardness to 40 degrees or less. As one example, it is punched from a sheet state for shaping.

As the materials of the filter 104 shown in FIG. 18 and the filter 114 shown in FIG. 19, preferably use is made of a polytetrafluoroethylene (PTFE).

A filter using PTFE could raise the dust trapping efficiency to almost 100% (for example 99.99%).

This filter has a predetermined pressure resistance. Where a large difference is generated between the air pressure in the cartridge and the air pressure outside of the filter, it filters the air on the outside of the filter to obtain clean air.

Note that it is also possible to use the filter for filtering dust and chemical gas.

In this case, as the material of the filter, use is made of one containing an activated carbon in the PTFE. It is also possible to adjust the humidity by using a silica gel in place of the activated carbon.

The activated carbon attracts an organic gas, but it is also possible to further treat the activated carbon by alkali and eliminate a corrosive acidic gas.

Summarizing the effects of the invention, according to the disk drive of the present invention, when a cartridge is loaded in the carrier, the sealing member formed with a lip in contact with the bottom surface of the cartridge so as to surround the opening is attached to the carrier, therefore the entry of air containing dust from the opening into the cartridge at the time of rotation of the disk-shaped recording medium is prevented.

The base portion of the sealing member has a part located inward from the lip and that part is attached to the carrier, whereby it is possible to reduce the trouble of attaching the sealing member compared with the case where the attachment is carried out beneath the inclined resilient lip.

While the invention has been described by reference to specific embodiments chosen for purposes of illustration, it should be apparent that numerous modifications could be made thereto by those skilled in the art without departing from the basic concept and scope of the invention.

What is claimed is:

1. A disk drive comprising:
    a carrier into which is loaded a cartridge in which a disk-shaped recording medium is rotatably accommodated and in which an opening for exposing a center portion of said disk-shaped recording medium is formed in a bottom surface thereof,
    a rotation table which enters from said opening of said cartridge loaded in said carrier, clamps said disk-shaped recording medium at said center portion and rotates said disk-shaped recording medium,
    a resilient sealing member which is attached to said carrier and prevents air containing dust from being sucked into said cartridge through said opening due to rotation of said disk-shaped recording medium, wherein
        said sealing member includes an annular base portion and a lip having a shape projecting from said annular base portion and flaring outward,
        said lip is pushed against the bottom surface of said cartridge so as to surround said opening of the loaded cartridge, and
        said base portion includes a part located inside said lip which is attached to said carrier,
    a plurality of projections for positioning said cartridge,
        each of said plurality of projections including a head contacting the bottom surface of said cartridge,
        said base portion has a plurality of through holes corresponding to said plurality of projections in the part located inside said lip, and
        said sealing member is attached to said carrier by said plurality of projections penetrating through said corresponding plurality of through holes.

2. The disk drive as set forth in claim 1, wherein the head of each projection is of a diameter larger than that of said through hole to an extent enabling said projection to be fit into said through hole.

3. The disk drive as set forth in claim 1, wherein:
said sealing member is made of a silicone rubber, and
said disk-shaped recording medium is a removable hard disk.

4. A disk drive comprising:
    a carrier into which is loaded a cartridge in which a disk-shaped recording medium is rotatably accommodated and in which an opening for exposing a center portion of said disk-shaped recording medium is formed in a bottom surface thereof,
    a rotation table which enters from said opening of said cartridge loaded in said carrier, clamps said disk-shaped recording medium at said center portion and rotates said disk-shaped recording medium,
    a resilient sealing member which is attached to said carrier and prevents air containing dust from being sucked into said cartridge through said opening due to rotation of said disk-shaped recording medium, wherein
        said sealing member includes an annular base portion and a lip having a shape projecting from said annular base portion and flaring outward,
        said lip is pushed against the bottom surface of said cartridge so as to surround said opening of the loaded cartridge, and
        said base portion includes a part located inside said lip which is attached to said carrier, wherein:
            said lip includes first and second lips, wherein
                said first and second lips project from a top surface of said base portion,
                said first lip is located outside said second lip,
                a height of said first lip from a center portion of said base portion is higher than a height of said second lip from the center portion of said base portion when said cartridge is not loaded, and
                said first and second lips contact the bottom surface of said cartridge and the heights of said first and second lips from the center portion of said base portion are the same when said cartridge is loaded.

5. The disk drive as set forth in claim 4, wherein:
said first and second lips are substantially parallel,
a length of said first lip is longer than a length of said second lip, and
the heights of said first and second lips from the center portion of said base portion are substantially the same when said cartridge is not loaded.

6. A disk drive comprising:
    a carrier into which is loaded a cartridge in which a disk-shaped recording medium is rotatably accommodated and in which an opening for exposing a center portion of said disk-shaped recording medium is formed in a bottom surface thereof,
    a rotation table which enters from said opening of said cartridge loaded in said carrier, clamps said disk-shaped recording medium at said center portion and rotates said disk-shaped recording medium,
    a resilient sealing member which is attached to said carrier and prevents air containing dust from being sucked into said cartridge through said opening due to rotation of said disk-shaped recording medium, wherein
        said sealing member includes an annular base portion and a lip having a shape projecting from said annular base portion and flaring outward,
        said lip is pushed against the bottom surface of said cartridge so as to surround said opening of the loaded cartridge, and said base portion includes a part located inside said lip which is attached to said carrier, wherein:
said lip comprises first and second lips, wherein
said first lip projects from the top surface of said base portion and contacts the bottom surface of said cartridge when said cartridge is loaded, and
said second lip projects from a bottom surface of said base portion and contacts said carrier.

7. The disk drive as set forth in claim 6, wherein said first and third lips are formed substantially symmetrically about said base portion.

8. A resilient sealing member having an annular base portion and a lip having a shape projecting from said annular base portion and flaring outward, wherein
said base portion has a part located inside said lip, with a plurality of through holes formed in the part, and
said lip comprises first and second lips, wherein
said first and second lips project from one surface between a top and bottom surface of said base portion, with
said first lip located outside said second lip, and wherein
a height of said first lip from a center portion of said base portion is higher than a height of said second lip from the center portion of said base portion.

9. The sealing member as set forth in claim 8, wherein:
said first and second lips are substantially parallel to each other,
a length of said first lip is longer than a length of said second lip, and
the heights of said first and second lips from the center portion of said base portion are substantially the same.

10. The sealing member as set forth in claim 8, wherein:
said base portion forms a band shape having substantially a same width along a periphery of a predetermined shape, and
said predetermined shape is one of a square, an oval, and a circle.

11. A sealing member having an annular base portion and a lip having a shape projecting from said annular base portion and flaring outward, wherein
said base portion has a part located inside said lip, with a plurality of through holes formed in the part, wherein:
said lip comprises first and second lips,
said first lip projects from a top surface of said base portion, and
said second lip projects from a bottom surface of said base portion.

12. The sealing member as set forth in claim 11, wherein said first and second lips are substantially symmetrical to each other about said base portion.

13. A sealing member having an annular base portion and a lip having a shape projecting from said annular base portion and flaring outward, wherein
said base portion has a part located inside said lip, with a plurality of through holes formed in the part, wherein:
said lip comprises first, second, third, and fourth lips, wherein
said first and second lips project from a top surface of said base portion,
said third and fourth lips project from a bottom surface of said base portion,
said first lip is located outside said second lip,
said third lip is located outside said fourth lip, a height of said first lip from a center portion of said base portion is higher than a height of said second lip from the center portion of said base portion, and
a height of said third lip from the center portion of said base portion is higher than a height of said fourth lip from the center portion of said base portion.

14. The sealing member as set forth in claim 13, wherein:
said first and second lips are substantially parallel to each other,
said third and fourth lips are substantially parallel to each other,
a length of said first lip is longer than a length of said second lip,
a length of said third lip is longer than a length of said fourth lip, the heights of said first and second lips from the center portion of said base portion are substantially the same, and
the heights of said third and fourth lips from the center portion of said base portion are substantially the same.

15. The sealing member as set forth in claim 13, wherein:
said first and third lips are formed substantially symmetrically about said base portion, and
said second and fourth lips are formed substantially symmetrically about said base portion.

16. A sealing member having an annular base portion and a lip having a shape projecting from said annular base portion and flaring outward, wherein
said base portion has a part located inside said lip, with a plurality of through holes formed in the part, wherein:
said base portion forms a band shape having substantially a same width along a periphery of a predetermined shape, and
said predetermined shape is a shape of a rectangle with one short side removed and an arc of a semi-circle having a diameter equal to a length of the one short side connected to ends of two long sides of the rectangle.

* * * * *